(12) United States Patent
Shimakawa

(10) Patent No.: US 12,081,706 B2
(45) Date of Patent: Sep. 3, 2024

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Yasunori Shimakawa, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/483,052

(22) Filed: Oct. 9, 2023

(65) Prior Publication Data

US 2024/0114097 A1 Apr. 4, 2024

Related U.S. Application Data

(63) Continuation of application No. 18/052,503, filed on Nov. 3, 2022, now Pat. No. 11,811,979, which is a continuation of application No. 17/307,418, filed on May 4, 2021, now Pat. No. 11,523,009, which is a continuation of application No. 16/796,386, filed on Feb. 20, 2020, now Pat. No. 11,025,788.

(30) Foreign Application Priority Data

Feb. 28, 2019 (JP) .................................. 2019-036857

(51) Int. Cl.
| | |
|---|---|
| H04N 1/00 | (2006.01) |
| G06V 10/94 | (2022.01) |
| G06V 30/10 | (2022.01) |
| G06V 30/412 | (2022.01) |
| G06V 30/413 | (2022.01) |

(52) U.S. Cl.
CPC ....... *H04N 1/00122* (2013.01); *G06V 10/945* (2022.01); *G06V 30/412* (2022.01); *G06V 30/413* (2022.01); *H04N 1/00331* (2013.01); *H04N 1/00368* (2013.01); *G06V 30/10* (2022.01)

(58) Field of Classification Search
CPC .... G06V 10/945; G06V 30/10; G06V 30/412; G06V 30/413; H04N 1/00122; H04N 1/00331; H04N 1/00368
USPC ........................................................ 358/474
See application file for complete search history.

(56) References Cited

U.S. PATENT DOCUMENTS

| | | | | |
|---|---|---|---|---|
| 5,381,248 | A * | 1/1995 | Ikeda | H04N 1/3871 |
| | | | | 358/453 |
| 8,355,578 | B2 * | 1/2013 | Sohma | G06V 30/416 |
| | | | | 382/176 |
| 11,025,788 | B2 * | 6/2021 | Shimakawa | H04N 1/00122 |
| 11,523,009 | B2 * | 12/2022 | Shimakawa | G06V 10/945 |
| 11,652,932 | B2 * | 5/2023 | Tsukada | G06V 30/153 |
| | | | | 358/1.15 |
| 11,811,979 | B2 * | 11/2023 | Shimakawa | H04N 1/00331 |
| 2019/0065451 | A1 * | 2/2019 | Miyamoto | G06V 30/414 |
| 2020/0410277 | A1 * | 12/2020 | Oya | G06V 30/40 |

* cited by examiner

*Primary Examiner* — Negussie Worku
(74) *Attorney, Agent, or Firm* — Canon U.S.A., Inc. IP Division

(57) ABSTRACT

Images of the plurality of document pages are scanned to generate image data with one scanning instruction. A single folder named with a received character string is determined as a storage destination of image data corresponding to the plurality of document pages generated with the scanning instruction.

9 Claims, 27 Drawing Sheets

FIG.6

| DEVICE SERIAL NO.: abcd0101 | |
|---|---|
| APPLICATION MANAGEMENT | ONE-TOUCH TRANSMISSION SCAN > DETAILED BUTTON INFORMATION > BUTTON EDITING |

BUTTON EDITING ~600

612~ [OK]  [CANCEL]~613

DETAILED BUTTON INFORMATION

BASIC SETTING
BUTTON NAME: [MEDICAL QUESTIONNAIRE] ~601
☐ DISPLAY CONFIRMATION SCREEN BEFORE EXECUTION

FILE NAME: [BUTTON NAME ▼] ~602
          [AUTOMATIC]

KEYWORD: 603~ ☑ ENABLE [SET KEYWORD STRING] ~604

ICON  ☑ 📄  ☐ 📝  ☐ 📃  ☐ 📚  ☐ 🔺

ORGANIZATION  [DO NOT ORGANIZE ▼] ~605
              [ORGANIZE (FILE)]
              [ORGANIZE (FOLDER)]
              [ORGANIZE (FILE AND FOLDER)]

TRANSMISSION TYPE:  [FILE ▼]           [CHANGE] ~607
                    [E-MAIL]
              606  [USB MEMORY]

608~ TRANSMISSION SETTING (FILE)

{ SETTING MENU CHANGES FOR EACH TRANSMISSION TYPE

TRANSMISSION DESTINATION: [\\FILE SERVER\MEDICAL_QUESTIONNAIRE] [SELECT FROM ADDRESS BOOK...]
SCAN SIZE: [A4 ▼]                          609              610
COLOR MODE: [COLOR ▼]
FILE FORMAT: [PDF ▼] ~611
  ENCRYPTED PDF: [EQUIVALENT TO Acrobat 10.0/256-bit AES ▼]
  ☐ SET/CHANGE PASSWORD
  PASSWORD: [           ]
  INPUT PASSWORD FOR CONFIRMATION: [           ]
  ELECTRONIC SIGNATURE: [NONE ▼]
  ☐ DIVIDE FOR EACH PAGE
DENSITY: [0 ▼]
DOCUMENT ORIENTATION: [LONGITUDINALLY LONG DOCUMENT ▼]
DOCUMENT TYPE: [TEXT/PHOTOGRAPH ▼]
DOUBLE-SIDED DOCUMENT: [SPREAD DOCUMENT ▼]
SHARPNESS: [0 ▼]
DATA SIZE: [LARGE: IMAGE QUALITY PRIORITIZED ▼]

FIG.17A
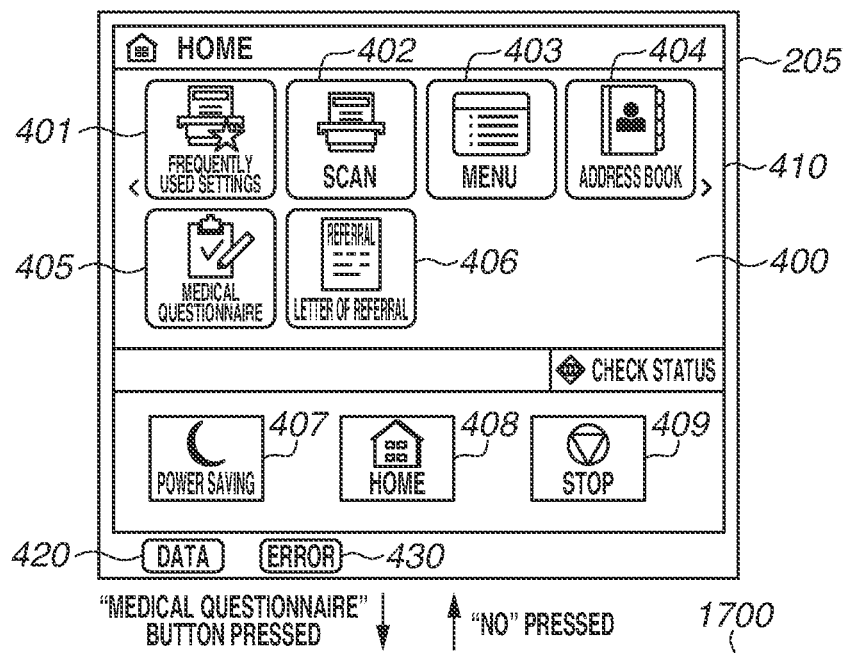
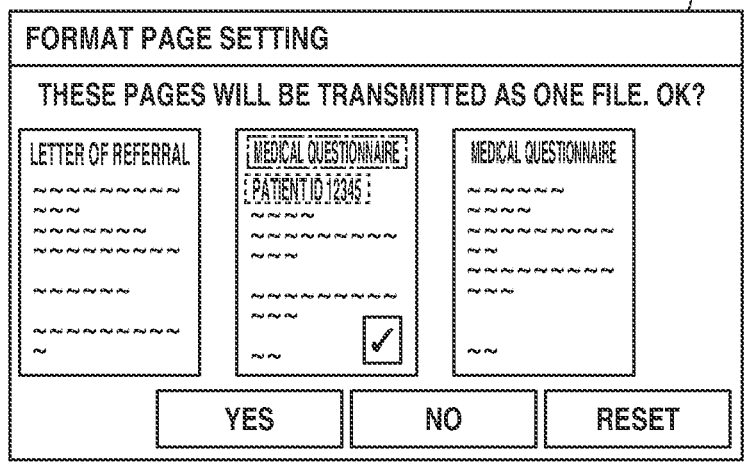
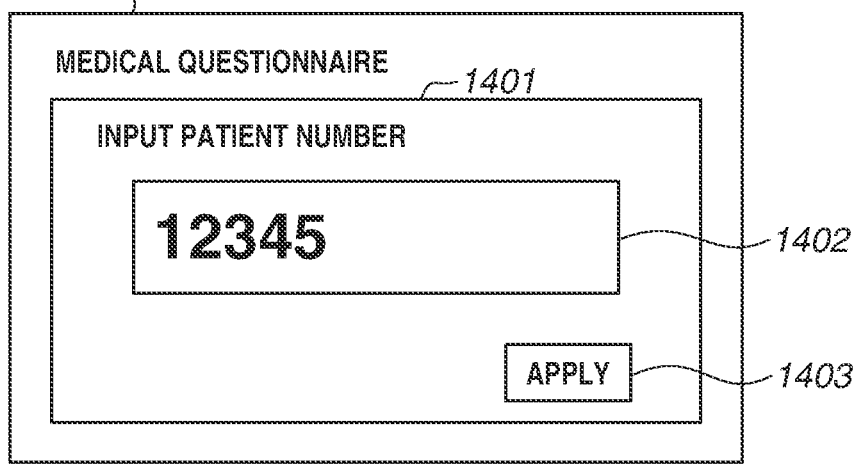

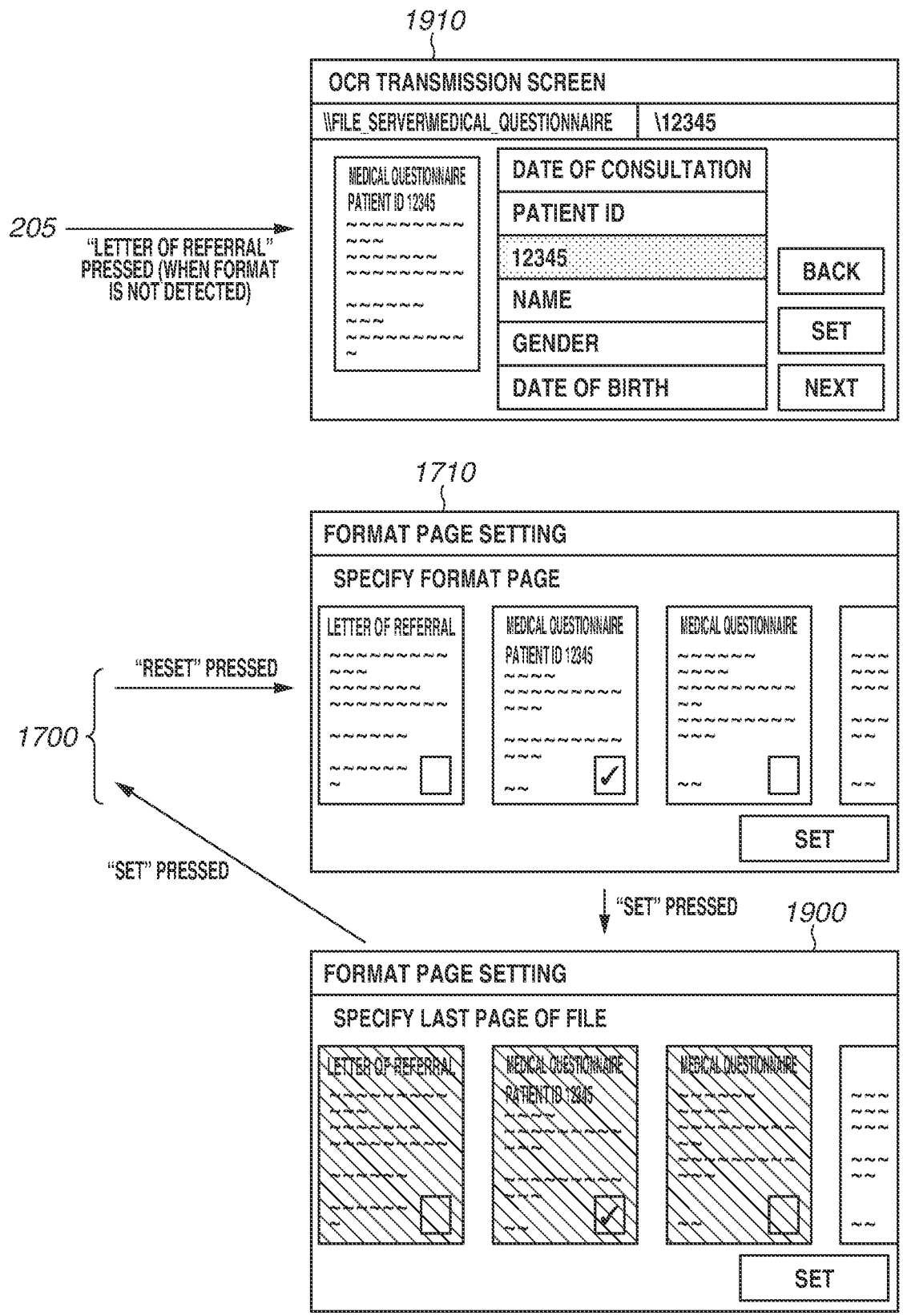

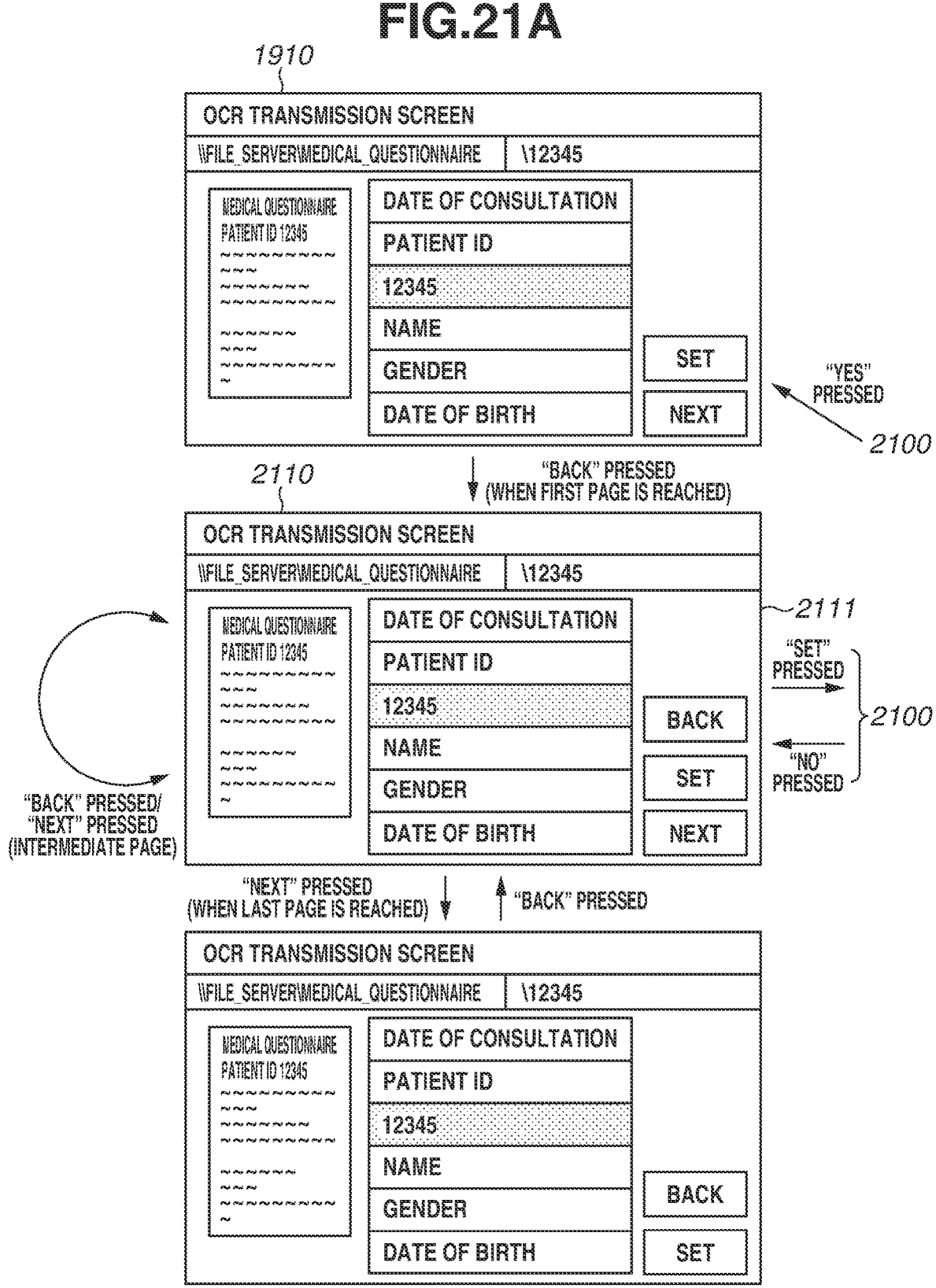

IMAGE PROCESSING APPARATUS, METHOD FOR CONTROLLING THE SAME, AND STORAGE MEDIUM

CROSS REFERENCE TO RELATED APPLICATIONS

The present application is a continuation of U.S. patent application Ser. No. 18/052,503, filed on Nov. 3, 2022, which is a continuation of U.S. patent application Ser. No. 17/307,418, filed on May 4, 2021, issued as U.S. Pat. No. 11,523,009 on Dec. 6, 2022, which is a continuation of U.S. patent application Ser. No. 16/796,386 filed on Feb. 20, 2020, issued as U.S. Pat. No. 11,025,788 on Jun. 1, 2021, which claims priority from Japanese Patent Application No. 2019-036857, filed Feb. 28, 2019, all of which are hereby incorporated by reference herein in their entirety.

BACKGROUND

Field

The present disclosure relates to an image processing apparatus, a method for controlling the image processing apparatus, and a storage medium.

Description of the Related Art

Japanese Patent Application Laid-Open No. 2005-234708 discusses an image processing apparatus that performs character recognition processing on an area pre-specified by a user, scans an image of a document into a folder named with a character string obtained in the character recognition processing, and transmits generated image data.

The technique discussed in Japanese Patent Application Laid-Open No. 2005-234708 makes it possible to determine the name of a folder for storing image data generated by scanning a document, by using a character string included in the document.

The technique discussed in Japanese Patent Application Laid-Open No. 2005-234708, however, cannot set to the folder path a character string which is intended to be used as the name of the destination folder by the user, for a document that does not include the intended character string in a specified area.

Thus, it is desirable for the user to easily set the name of the folder for storing image data generated by scanning the document, by using a character string included in the document after scanning an image of the document.

In sending image data including a plurality of document pages to the same folder, it takes time and effort for operations if the user selects a folder name from a character recognition result for each page. In addition, in a case where only one of the plurality of document pages includes the character string to be used as the folder name, it is desirable for the user to easily specify the folder name by using a character string included in the document and store the plurality of document pages in the folder having the folder name.

SUMMARY

The present disclosure is directed to reducing user's work for setting a folder path by using a character string in a document, and allowing image data including a plurality of document pages to be stored in the same folder by using a character string on one document page.

According to an aspect of the present disclosure, an image processing apparatus includes a scan unit configured to scan an image of a document to generate image data, a character recognition unit configured to recognize one or more character strings included in the image data generated by the scan unit, a display unit configured to display the one or more character strings recognized by the character recognition unit, a reception unit configured to receive a character string selected by a user from among the one or more character strings displayed by the display unit, a determination unit configured to determine a folder named with the selected character string received by the reception unit, as a storage destination of the image data, and a storage unit configured to store the image data in the storage destination determined by the determination unit. The scan unit scans images of a plurality of document pages to generate image data with one scanning instruction. The determination unit determines the same folder named with the character string received by the reception unit as a storage destination of the image data corresponding to the plurality of document pages generated by the scan unit with the scanning instruction.

Further features of the present will become apparent from the following description of exemplary embodiments with reference to the attached drawings.

BRIEF DESCRIPTION OF THE DRAWINGS

FIGS. 17A and 17B illustrate an example of a screen transition in a one-touch transmission scan.

FIGS. 19A and 19B illustrate another example of a screen transition in a one-touch transmission scan.

FIGS. 21A and 21B illustrate a yet another example of a screen transition in a one-touch transmission scan.

DESCRIPTION OF THE EMBODIMENTS

Exemplary embodiments of the present disclosure will be described below with reference to the accompanying drawings. Configurations according to the following exemplary embodiments are to be considered as illustrative, and the present disclosure is not limited to illustrated configurations.

Figure 1:
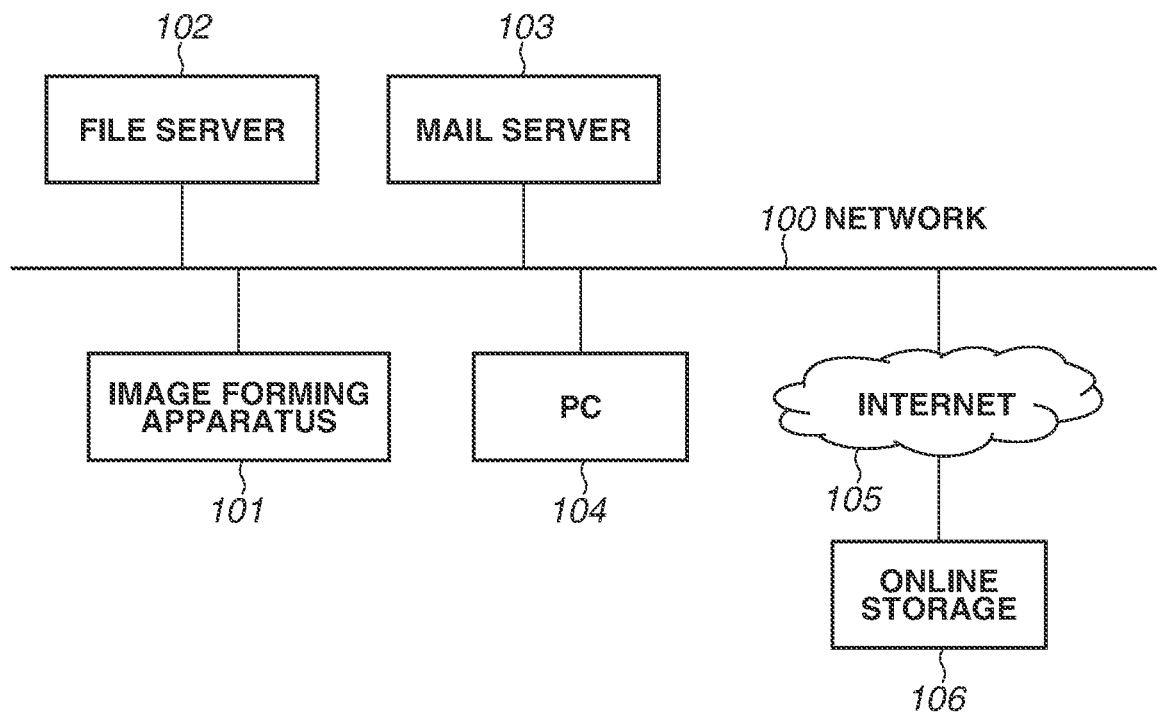
FIG. 1 illustrates an example of a configuration of a reading system.

A first exemplary embodiment of the present disclosure will be described below. FIG. 1 illustrates an example of a configuration of a reading system. The reading system according to the present exemplary embodiment includes a multifunction peripheral (MFP) 101 as an example of an image processing apparatus, a file server 102 as an information processing apparatus, a mail server 103, and an online storage 106. The MFP 101, the file server 102, the mail server 103, and the online storage 106 are connected to a Local Area Network (LAN) 100. On the LAN 100, the MFP 101, the file server 102, the mail server 103, and the personal computer (PC) 104 are connected through a network so that they can communicate with each other. The MFP 101 and the online storage 106 can communicate with each other via the LAN 100 and the Internet 105.

The MFP 101 scans an image of a document, generates the read image, and transmits the generated image data to the file server 102, the mail server 103, and the online storage 106. Image data according to the present exemplary embodiment is not limited to electronic data obtained by an image being converted into RAW image format data, and may be electronic data in such image formats as Tag Image File Format (TIFF) and Joint Photographic Experts Group (JPEG), and electronic data in Portable Document Format (PDF). The file server 102 is a file server conforming to File Transfer Protocol (FTP) and the Server Message Block (SMB) protocols. The mail server 103 is a mail server conforming to Simple Mail Transfer Protocol (SMTP). The online storage 106 is an online storage conforming to Web-based Distributed Authoring and Versioning (Web-DAV) (a file sharing protocol using Hyper Text Transfer Protocol (HTTP)). The PC 104 accesses the web server included in the MFP 101 by using HTTP and is capable of referencing and updating setting values. The LAN 100 may include a wired LAN using Ethernet or a wireless LAN.

Figure 2:
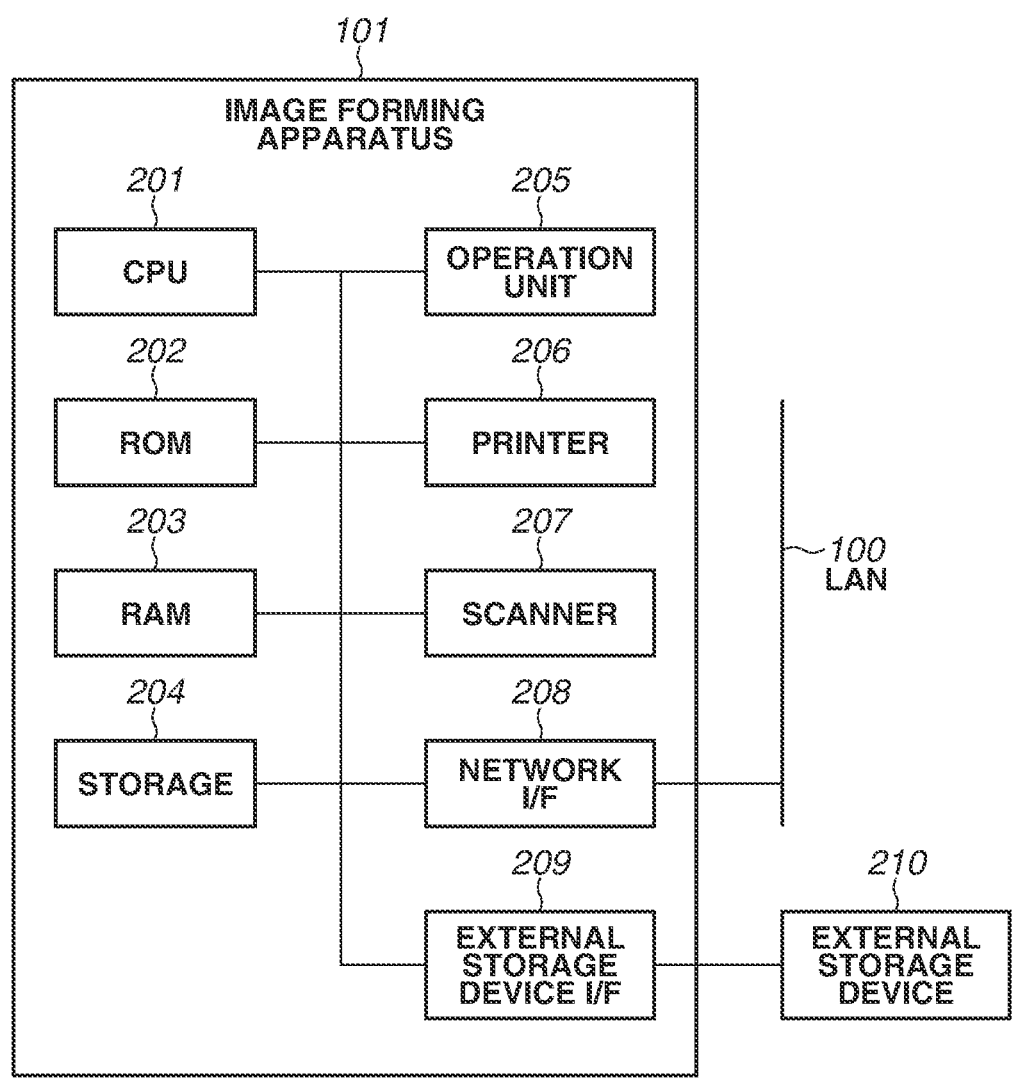
FIG. 2 illustrates an example of a hardware configuration of a multifunction peripheral (MFP).

FIG. 2 illustrates an example of a hardware configuration of the MFP 101. The MFP 101 includes a CPU 201, a ROM 202, a RAM 203, a storage 204, an operation unit 205, a printer 206, a scanner 207, a network interface (I/F) 208, and an external storage device OF 209.

The CPU 201 controls various hardware components 202 to 208 included in the MFP 101 to implement each function of the MFP 101. The CPU 201 transmits signals to various hardware components via bus lines to implement data communication with other hardware components.

The CPU 201 of the MFP 101 controls the operation of the MFP 101 in accordance with a control program stored in the ROM 202. More specifically, the CPU 201 executes an operating system (OS) for controlling the MFP 101 and driver programs for controlling the hardware components. Function operations and control desired by the user are implemented by application programs arranged on the OS mutually operating. The OS and various programs stored in the ROM 202 are read in the RAM 203 and then executed.

The ROM 202 is a memory for storing programs and various data to be used by the CPU 201. The RAM 203 is a work memory for temporarily storing a program and data to be used for computations by the CPU 201. The storage 204 is a storage device for storing various data and various programs.

Although a flash memory is assumed as the storage 204 according to the present exemplary embodiment, a solid state drive (SSD), a hard disk drive (HDD), an embedded multimedia card (eMMC), and other auxiliary storage devices are also applicable. Although, in the MFP 101, a single CPU 201 executes processing illustrated in flowcharts (described below) by using a single memory (RAM 203), the MFP 101 may use other configurations. For example, processing illustrated in flowcharts (described below) may be performed by a plurality of CPUs, a plurality of RAMs, a plurality of ROMs, and a plurality of storages being operated in a collaborative way. Part of processing may be executed by using hardware circuitry, such as an Application Specific Integrated Circuit (ASIC) and a Field Programmable Gate Array (FPGA).

The operation unit 205, which is a user interface, such as a touch panel, for the user to operate the MFP 101, receives operations and inputs by the user. The operation unit 205 can also be used as a display unit for displaying screens for operating the MFP 101.

The printer 206 is a unit for implementing a print function. The CPU 201 controls the printer 206 to execute a print job received from the PC 104, thus printing an image on paper. A print job herein is data including instructions to cause the MFP 101 to perform print processing, image data, and print setting information.

The scanner 207 is a unit for implementing a scanning function. The CPU 201 controls the scanner 207 to perform processing for optically scanning an image of a document and generating image data.

The network I/F 208 performs wired LAN communication, such as the communication over Ethernet. The network I/F 208 may be a network I/F for performing wireless LAN communication or a Universal Serial Bus (USB)-LAN I/F.

The external storage device I/F 209 is an interface for the MFP 101 to communicate with an external storage device 210. The CPU 201 controls the external storage device I/F 209 to store image data in the external storage device 210. Although, in the present exemplary embodiment, a USB interface is assumed as the external storage device I/F 209 and a USB memory is assumed as the external storage device 210, the external storage device I/F 209 may be a Secure Digital (SD) card slot for communicating with an external storage device, such as an SD card.

Figure 3:
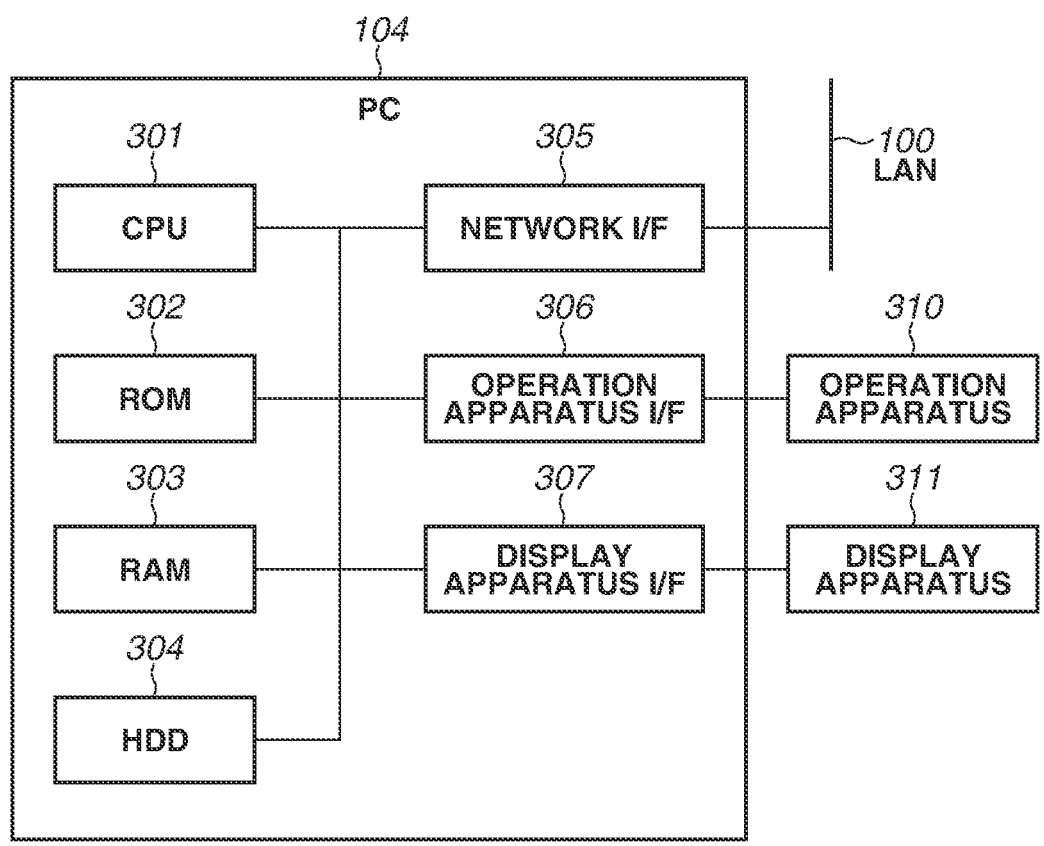
FIG. 3 illustrates an example of a hardware configuration of a personal computer (PC).

FIG. 3 illustrates an example of a hardware configuration of the PC 104. The PC 104 includes a CPU 301, a ROM 302, a RAM 303, an HDD 304, a network I/F 305, an operation apparatus I/F 306, and a display apparatus I/F 307.

The CPU 301 controls various hardware components 302 to 307 included in the PC 104 to implement each function of the PC 104. The CPU 301 transmits signals to various hardware components via bus lines to implement data communication with other hardware components.

The CPU 301 of the PC 104 controls the operation of the PC 104 in accordance with a control program stored in the ROM 302. More specifically, the CPU 301 executes the OS for controlling the PC 104. The function operations and control desired by the user are implemented by the application programs arranged on the OS mutually operating. The OS and various programs, which are stored in the ROM 302, are read in the RAM 303 and then executed.

The ROM 302 is a memory for storing programs and various data to be used by the CPU 201. The RAM 303 is a work memory for temporarily storing a program and data to be used for computations by the CPU 201. The HDD 304 is a storage device for storing various data and various programs.

The network I/F 305 performs wired LAN communication, such as one over Ethernet. The network I/F 305 may be a network I/F for performing wireless LAN communication or a USB-LAN I/F.

The operation apparatus I/F 306 is an interface for connecting the PC 104 to an operation apparatus 310, such as a keyboard and a mouse.

The display apparatus I/F 307 is an interface for connecting the PC 104 to a display apparatus 311, such as a liquid crystal display monitor.

Although the PC 104 according to the present exemplary embodiment is connected to an external operation apparatus and an external display apparatus, for example, an operation unit and a display unit may be built in the PC 104.

Figure 4:
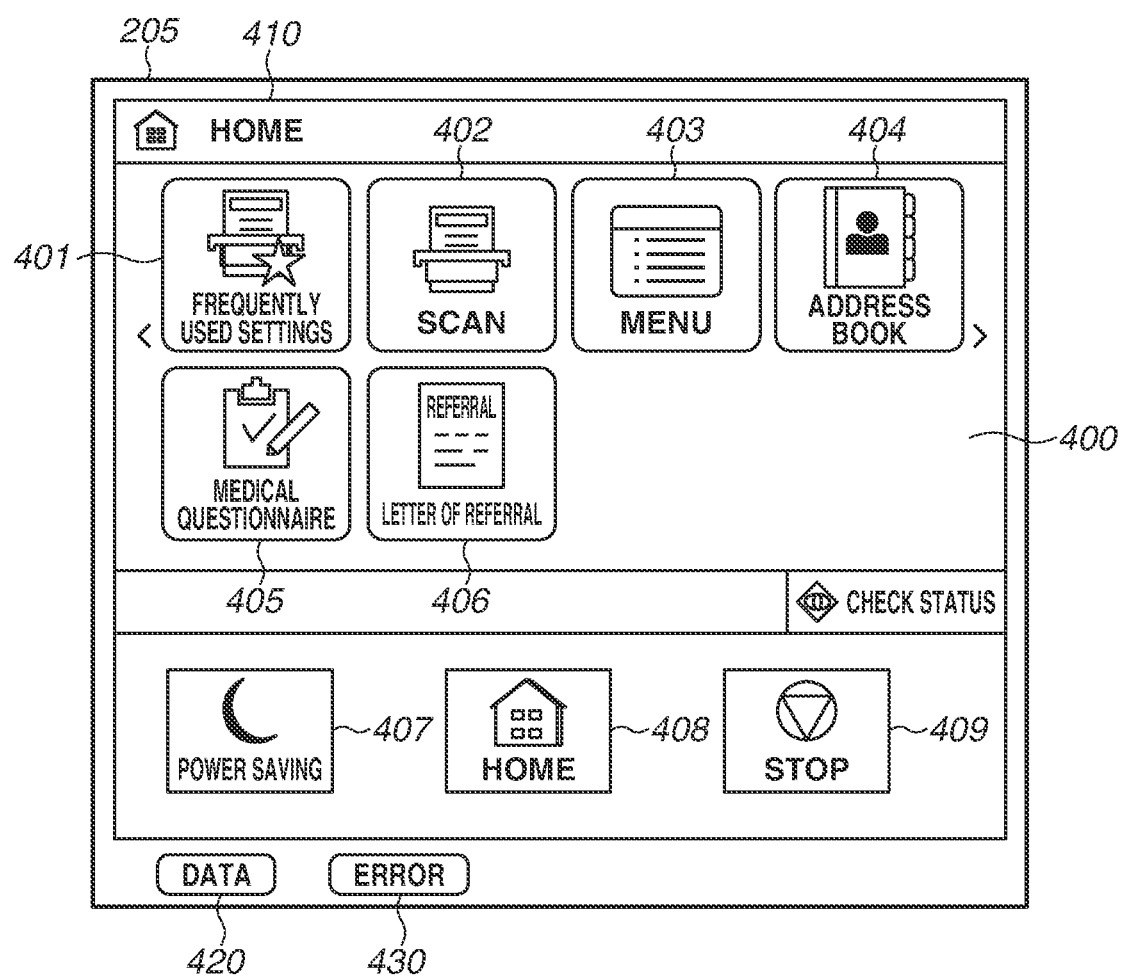
FIG. 4 illustrates an example of a screen displayed on an operation unit.

FIG. 4 illustrates an example of a screen which is displayed on the operation unit 205. The operation unit 205 includes a touch panel 410, a Data LED 420, and an Error LED 430. The touch panel 410 displays a Home screen 400 which is displayed immediately after the MFP 101 is activated. The Home screen 400 is a screen for the user to instruct the MFP 101 to execute functions of the MFP 101. The Home screen 400 displays a Frequently Used Settings button 401, a Scan button 402, a Menu button 403, an Address Book button 404, a Medical Questionnaire button 405, and a Letter of Referral button 406. The Home screen 400 constantly displays a Power-saving button 407, a Home button 408, and a Stop button 409. The Power-saving button 407, the Home button 408, and the Stop button 409 may be provided as hardware keys on the operation unit 205.

The Frequently Used Settings button 401 is used for displaying, when selected by the user, a screen for performing a specific function in a state where user settings have been input.

The Scan button 402 is used for displaying, when selected by the user, a screen for performing scan processing to generate image data, transmitting the generated image data through e-mail or file transmission, and storing the image data in the external storage device 210. The e-mail transmission refers to transmitting image data generated by scanning a document, as attachment data with an e-mail. The file transmission refers to transmitting image data to the file server 102 or the PC 104 by using a communication protocol, such as SMB and FTP.

The Menu button 403 is used for displaying, when selected by the user, a menu screen.

The Address Book button 404 is used for displaying, when selected by the user, a screen displaying registered addresses (destination information). The screen displaying addresses exhibits the transmission type, such as, e-mail transmission, SMB transmission, FTP transmission, and WebDAV transmission, and destination information, such as mail address, host name, and server information.

The Medical Questionnaire button 405 and the Letter of Referral button 406 are one-touch transmission buttons. A one-touch transmission button is used for displaying, when selected by the user, a screen for scanning an image of a document based on scanning settings preset by the user to generate image data, and transmitting the image data based on the transmission type preset by the user. More specifically, selecting the Medical Questionnaire button 405 is equivalent to receiving a scanning instruction.

The Power-saving button 407 is used for shifting, when selected by the user, the MFP 101 to the power-saving state.

The Home button 408 is used for displaying, when selected by the user, the Home screen 400 on the operation unit 205.

The Stop button 409 is used for canceling, when selected by the user, the execution of a job, such as a print job currently being executed by the MFP 101. This Stop button 409 may cancel the execution of a copy job or a transmission job when selected by the user.

The Data LED 420 and the Error LED 430 notify the user of the status of the MFP 101. The Data LED 420 illuminates during execution of e-mail or file transmission. The Error LED 430 illuminates if an error occurs in the MFP 101.

The Home screen 400 is a function selection screen for a user to select a function to use from among a plurality of functions including a copy function of performing printing based on image data, and a transmission function of scanning a document to generate image data and transmitting the image data to an external apparatus.

Figure 5:
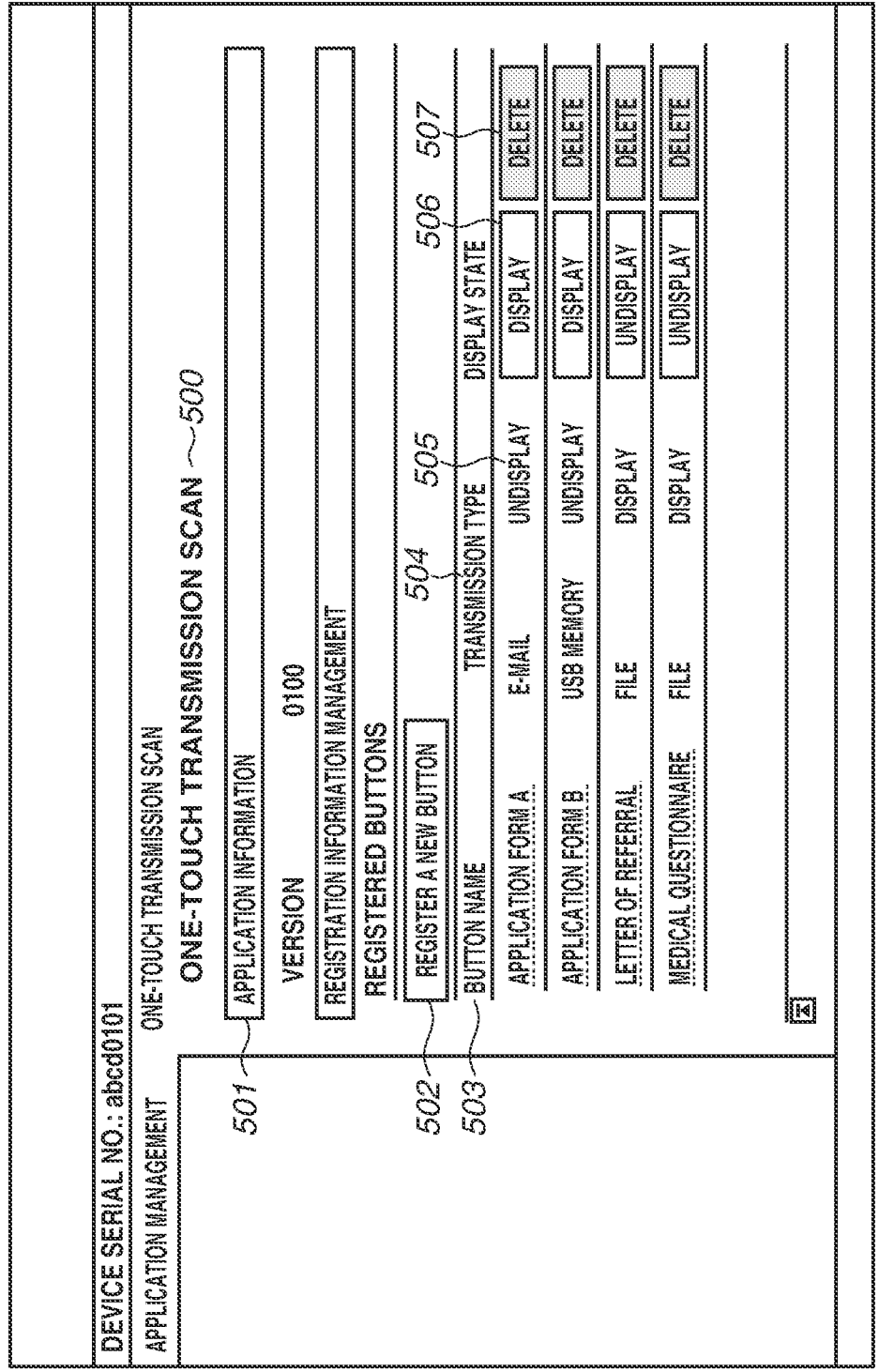
FIG. 5 illustrates an example of a one-touch transmission scan setting screen displayed on a display apparatus.

FIG. 5 illustrates an example of a one-touch transmission scan setting screen which is displayed on a display apparatus 311.

A one-touch transmission scan setting screen 500 illustrated in FIG. 5 is displayed, for example, on the display apparatus 311 connected to the PC 104 which is accessing the web server of the MFP 101 through HTTP communication.

The one-touch transmission scan setting screen 500 displays Application Information area 501, a "Register New Button" button 502, items 503 to 505, Display/Undisplay buttons 506, and Delete buttons 507.

The Application Information area 501 displays the version number of the application. Referring to FIG. 5, the version number 1.00 is displayed.

Figure 6:
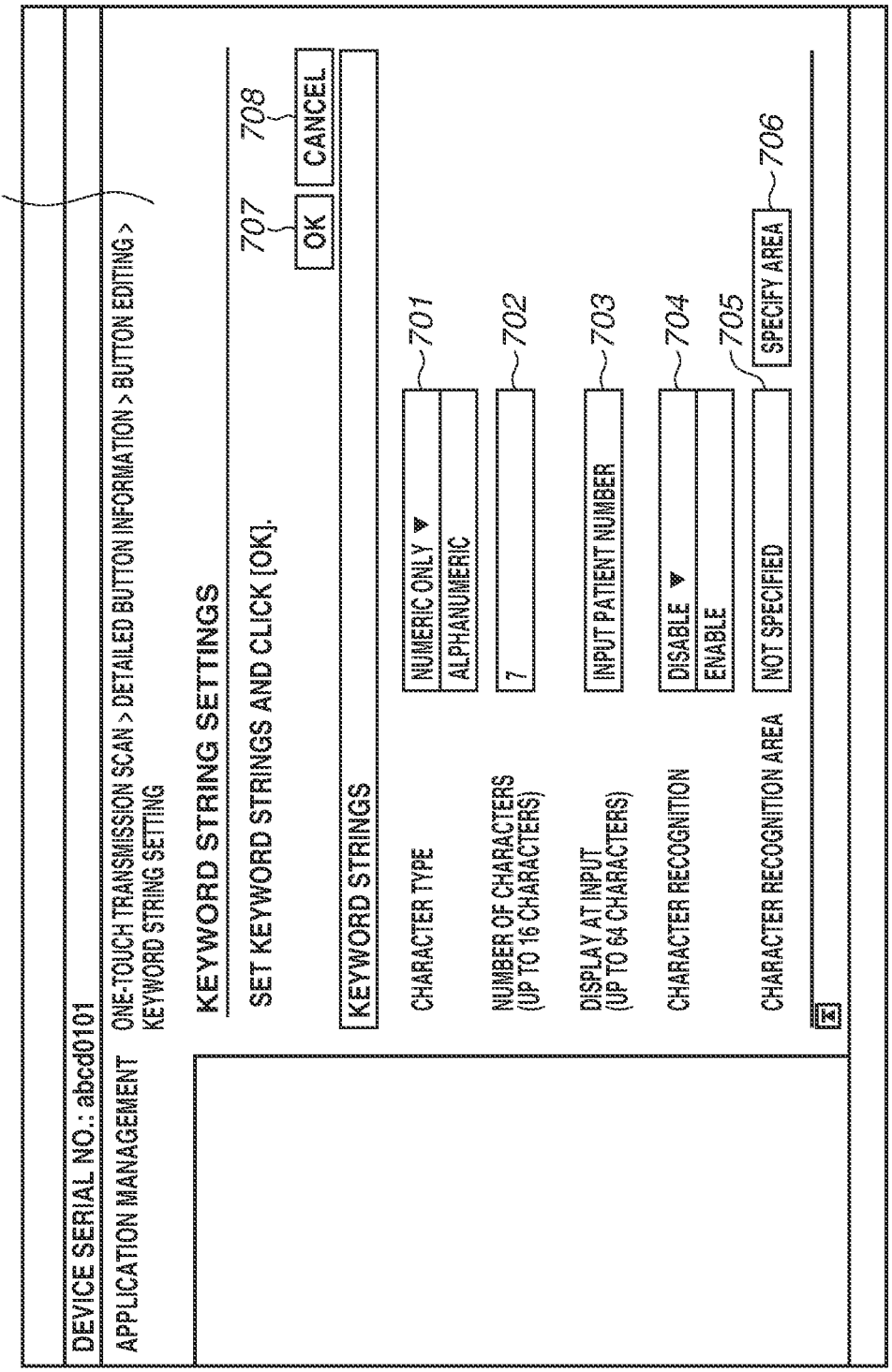
FIG. 6 illustrates an example of a button setting editing screen for performing a one-touch transmission scan.

The "Register New Button" button 502 is used for, when selected by the user, registering a new button which is to be displayed on a screen displayed on the operation unit 205 and is used for executing a one-touch transmission scan. When the "Register New Button" button 502 is selected, a button setting editing screen 600 illustrated in FIG. 6 is displayed on the display apparatus 311. The button setting editing screen 600 illustrated in FIG. 6 will be described in detail below.

The item 503 indicates the names of buttons for performing one-touch transmission scan registered in the MFP 101.

The item 504 indicates the transmission type set to each button for performing one-touch transmission scan registered in the MFP 101.

The item 505 indicates the display forms of buttons for performing one-touch transmission scan registered in the MFP 101. The one-touch transmission scan setting screen 500 also displays the Display/Undisplay buttons 506 for changing the display form of the buttons, and the Delete buttons 507. For example, when the display form of the "Letter of Referral" button is "Display", the button is displayed on the Home screen 400 on the touch panel 410, as in "the Letter of Referral" button 406 illustrated in FIG. 4. The Display/Undisplay buttons 506 enables the user to select either "Display" or "Undisplay" in a toggle manner.

The Delete button 507 deletes information related to the button registered in the MFP 101 when selected by the user.

The button named "Application A" is an example of a button for performing one-touch transmission scan registered in the MFP 101. For this button, the transmission type is "E-mail", and the display form is "Undisplay". The button setting editing screen 600 illustrated in FIG. 6 is displayed on the display apparatus 311 not only when the "Register New Button" button 502 is selected but also when the name of an "Application A" button is selected.

Referring to FIG. 5, four buttons "Application A", "Application B", "Letter of Referral", and "Medical Questionnaire" are registered. The display states for the buttons for the "Letter of Referral" and the "Medical Questionnaire" indicate "Display", and thus buttons therefor are displayed on the Home screen 400. The display states for the buttons for "Application A" and the "Application B" buttons indicate "Undisplay", and thus buttons therefor are not displayed on the Home screen 400.

FIG. 6 illustrates an example of a button setting editing screen for editing a button to be used for performing a one-touch transmission scan. The button setting editing screen 600 illustrated in FIG. 6 is displayed, for example, on the display apparatus 311 connected to the PC 104 which is accessing the web server of the MFP 101 through HTTP communication.

The button setting editing screen 600 is displayed when the user selects the "Register New Button" button 502 or the name of a button illustrated in FIG. 5. When the user selects the name of a button, the button setting editing screen 600 is displayed in a state where the last setting values are input for each item. When the user selects the "Register New Button" button 502, the button setting editing screen 600 is displayed in a state where the setting values are not input for any item. Default values may be pre-input for each item in the button setting editing screen 600.

An input field 601 is used to set the name of a one-touch transmission button. A character string "Letter of Referral" is input to the input field 601. A one-touch transmission button performs one-touch transmission scan when selected by the user.

A pull-down menu 602 is an object for setting a file name. The pull-down menu 602 includes options "Button Name" and "Automatic". When "Button Name" is selected, the button name input to the input field 601 becomes the name of a file to be transmitted. When "Automatic" is selected, an automatically determined character string becomes the name of a file. For example, the date and time when scan is performed by the user selecting a one-touch transmission button to be registered in the screen illustrated in FIG. 6 is used as the name of the file.

When a check box 603 is checked, the keyword that is used at the time of file output is enabled. This keyword will be described in detail below with reference to FIGS. 7A and 7B.

Figure 7:
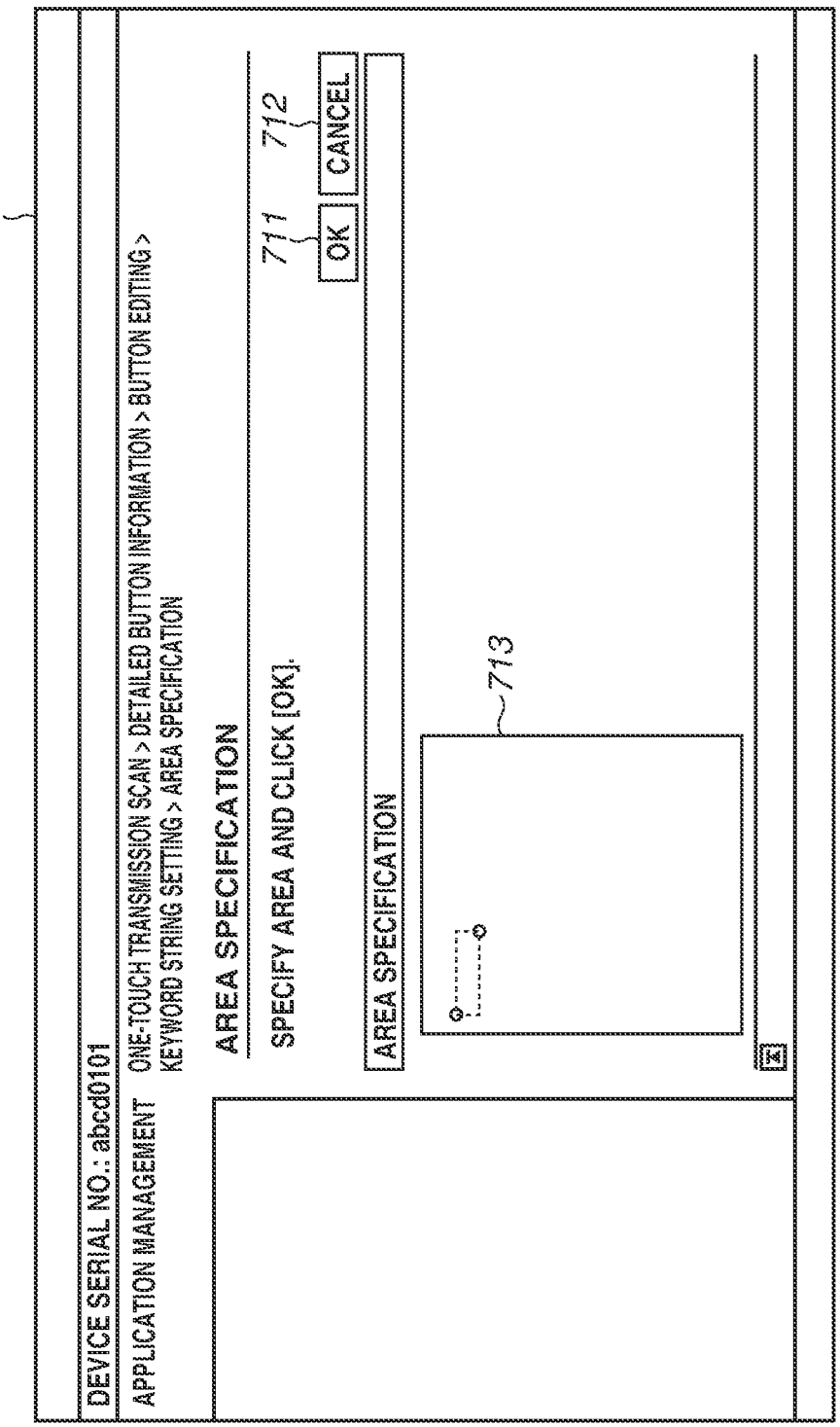
FIGS. 7A and 7B illustrate examples of screens displayed when setting keyword strings.

A keyword character string setting button 604 is used for displaying a keyword character string setting screen 700 illustrated in FIG. 7A when selected by the user.

A pull-down menu 605 is an object for setting how and whether the transmitted file is to be organized. The user can select one from among "Do Not Organize", "Organize (File)", "Organize (Folder)", and "Organize (File and Folder)" in the pull-down menu 605. When "Do Not Organize" is selected, a keyword is not used. When "Organize (File)" is selected, a keyword is to be included in an output file name. When "Organize (Folder)" is selected, a keyword is to be included in the folder name of a folder to which a file is to be stored. When "Organize (File and Folder)" is selected, a keyword is included in the file name and the folder name to which the file is to be output. Processing which is performed when respective setting is made from the pull-down menu 605 will be described in detail below with reference to FIGS. 16 and 17.

A pull-down menu 606 is an object for selecting the transmission type in transmitting image data generated by a document being scanned. The user can select one from among "File", "E-mail", and "USB Memory" in the pull-down menu 606. When "File" is selected and then a Change button 607 is selected, the image data is transmitted to a folder of the PC 104 or the file server 102 by using such a protocol as SMB, FTP, WebDAV, and Secure Shell File Transfer Protocol (SFTP). When "E-mail" is selected, the image data is transmitted to a destination by using SMTP. When "USB Memory" is selected, the image data is stored in the USB memory as the external storage device 210 connected to the MFP 101.

The Change button 607 is used for changing the transmission type setting to the transmission type displayed in the pull-down menu 606. When the Change button 607 is selected with the transmission type having been selected from the pull-down menu 606, information corresponding to the selected transmission type is displayed in an item 608 and an area 609.

For the item 608, various settings including scan settings at the time of document scanning with a one-touch transmission scan, and transmission settings at the time of transmission can be input. For example, the item 608 includes the destination as displayed in the area 609, reading size, file format, and document orientation settings.

The area 609 is used for displaying a transmission destination of the image data generated by a document being scanned. The destination which is set here is a folder path to be combined with the character string of a text object (described below). The area 609 is a text area where a text cannot be input or edited, and displays the address selected in the address selection screen.

A "Selection from Address Book" button 610 is used for displaying, when selected by the user, an address selection screen 800 in which addresses in the address book stored in the MFP 101 can be selected.

A pull-down menu 611 is used to set a file format to be used in generating a file of image data generated by an image of a document being scanned. A file is generated in the format selected by using the pull-down menu 611.

An OK button 612 is used for storing the setting for the one-touch transmission button in the storage 204 with the settings made in the button setting editing screen 600. When the OK button 612 is selected, the settings are stored in the storage 204. A Cancel button 613 is used for canceling the settings. When the OK button 612 or the Cancel button 613 is pressed, the one-touch transmission scan setting screen 500 illustrated in FIG. 5 is displayed.

FIGS. 7A and 7B illustrate examples of screens displayed in setting a keyword string. FIG. 7A illustrates an example of a keyword string setting screen. A keyword character string setting screen 700 is displayed by the keyword character string setting button 604 being selected in the button setting editing screen 600 illustrated in FIG. 6. The keyword character string setting screen 700 illustrated in FIG. 7A is displayed, for example, on the display apparatus 311 connected to the PC 104 which is accessing the web server in the MFP 101 through HTTP communication.

A pull-down menu 701 is an object for selecting a type of keyword strings. For the type of keyword strings, either "Numeric Only" or "Alphanumeric" can be selected.

An input field 702 is used to set the number of characters of the keyword strings. According to the present exemplary embodiment, the maximum number of settable characters is 16. If the character string recognized in the set character recognition area differs from the character string desired by the user, the different character string can be prevented from being displayed as a recognition result, by setting the number of characters of the keyword strings. The keyword string setting is reflected in a case where a Specify Area button 706 is selected and an area is specified in a character recognition area setting screen 710 illustrated in FIG. 7B.

An input field 703 is used to input a character string to be displayed in inputting keyword strings. The maximum number of settable characters is 64.

A pull-down menu 704 is an object for selecting whether to perform optical character recognition (OCR) processing.

An area 705 displays information indicating whether the character recognition area is specified. The initial value of the area 705 is set to "Do Not Specify". When the Specify Area button 706 is selected and a rectangular area is specified in the character recognition area setting screen 710 illustrated in FIG. 7B, "Specify" is displayed in the area 705. When a Cancel button 712 is selected in the character recognition area setting screen 710, "Do Not Specify" is displayed in the area 705.

FIG. 7B illustrates an example of the character recognition area setting screen 710. In the character recognition area setting screen 710, an area specification canvas 713 having an aspect ratio corresponding to the scan size for the paper to be read is displayed. The user is allowed to specify a start and an end point of a rectangular area by using a pointer. In this case, the start and end point coordinates are converted into real space distances which are temporarily stored. As specific examples of setting values, a start point (X, Y)=(10, 10) and an end point (X, Y)=(50, 20) can be set in mm. When the OK button 711 is selected, the temporarily stored coordinate information for the two points is stored in the storage 204. When the Cancel button 712 is selected, the coordinate information is deleted, and the processing returns to the screen illustrated in FIG. 7A.

Figure 8:
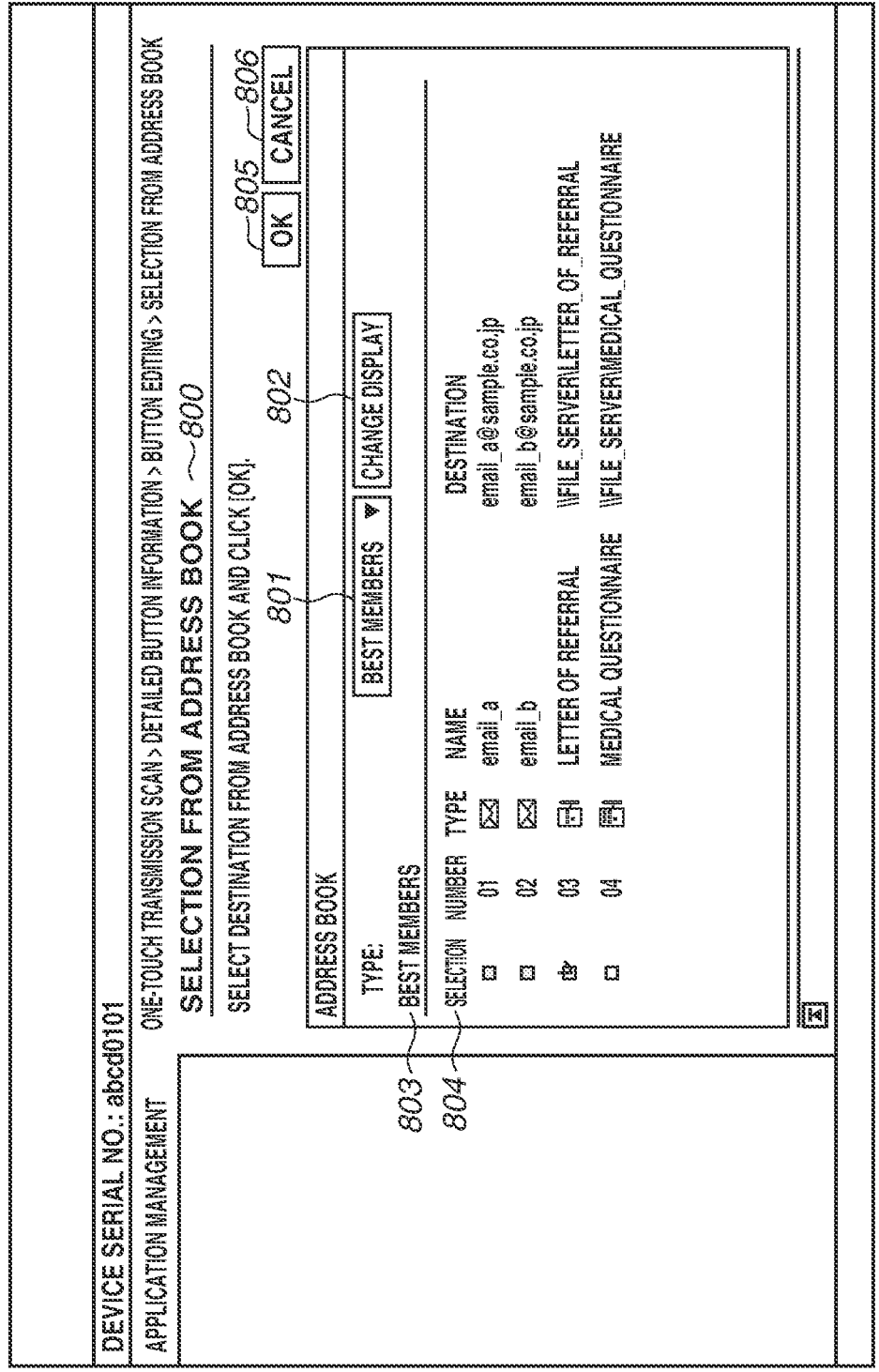
FIG. 8 illustrates an example of an address selection screen.

FIG. 8 illustrates an example of an address selection screen. The address selection screen 800 is displayed when the user selects the Selection From Address Book button 610 in the button setting editing screen 600 illustrated in FIG. 6. The address selection screen 800 illustrated in FIG. 8 is displayed, for example, on the display apparatus 311 connected to the PC 104 which is accessing the web server in the MFP 101 through HTTP communication.

A pull-down menu 801 is a list for changing the type of the address book to be displayed on the address selection screen 800. The pull-down menu 801 enables selection of either one of "Best Members" and "Abbreviated Dialing" (not illustrated).

A Change Display button 802 changes the type of the address book to be displayed on the address selection screen 800 to the type displayed in the pull-down menu 801 when selected by the user.

An area 803 is a display area where the name of the address book is displayed. A list 804 is an area where an address list is displayed. Each line in the list 804 includes a selectable check box for Selection, Number, Type, Name, and Destination. For Selection, either one of a checkable check box and an uncheckable check box is displayed. For Number, the address management number is displayed. For Type as an icon display area, a different icon is displayed based on the address type. For Name, the name attached to the address is displayed. For Destination, the address is displayed.

When an OK button 805 is selected in a state where the check box is checked, the address is displayed in the area 609. The MFP 101 receives the address from the PC 104 through HTTP communication and stores the address in the storage 204 as the destination address for the image data.

Supplementary information regarding the display of a checkable check box and an uncheckable check box will be described below. FIG. 8 illustrates a screen displayed when the user selects an address from the address book "Best Members" in a state where "File" is selected in the pull-down menu 606 illustrated in FIG. 6. In this address book, two addresses with the "File" transmission type and two addresses with the "E-Mail" transmission type are registered. In the address selection screen 800, destinations corresponding to the set transmission type are selectable with checkable check boxes as illustrated in FIG. 8. For an address the type of which coincides with the transmission type in the pull-down menu 606, a checkable check box is displayed. More specifically, an uncheckable check box is displayed for addresses with Numbers 01 and 02, and a checkable check box is displayed for addresses with Numbers 03 and 04.

The OK button 805 is used to determine address selection 800 based on the settings made in the address selection screen. A Cancel button 806 is used to cancel the settings. When the OK button 805 or the Cancel button 806 is selected, the button setting editing screen 600 illustrated in FIG. 6 is displayed.

The settings of the Medical Questionnaire button 405 according to the present exemplary embodiment will be described below. The Medical Questionnaire button 405 is registered in a state where "Medical Questionnaire" is input to the input field 601, "Button Name" is selected from the pull-down menu 602, and the check box 603 is checked in the button setting editing screen 600 illustrated in FIG. 6. The Medical Questionnaire button 405 is registered in a state where "Organize (Folder)" is selected from the pull-down menu 605 and "File" is selected from the pull-down menu 606 in the button setting editing screen 600 illustrated in FIG. 6. The Medical Questionnaire button 405 is registered in a state where "Numeric Only" is selected from the pull-down menu 701, "7" is input to the input field 702, and "Input Patient Number" is input to the input field 703 in the keyword character string setting screen 700 illustrated in FIG. 7A. The Medical Questionnaire button 405 is registered in a state where "Enable" is selected from the pull-down menu 704, the Specify Area button 706 is not selected, and "\\file_server\medical_questionnaire" for destination for Number 04 is selected in the address selection screen 800 illustrated in FIG. 8.

The use of the technique discussed in Japanese Patent Application Laid-Open No. 2005-234708 makes it possible to determine the name of a folder for storing image data generated by scanning a document, by using a character string included in the document.

The technique discussed in Japanese Patent Application Laid-Open No. 2005-234708, however, cannot set to the folder path an character string which is intended to be used as the name of the destination folder by the user, for a document that does not include the intended character string in a specified area.

Thus, it is desirable for the user to easily set the name of the folder for storing image data generated by scanning the document, by using a character string included in the document after scanning an image of the document.

In sending image data including a plurality of document pages to the same folder, it takes time and effort for operations if the user selects a folder name from a character recognition result for each page. In addition, in a case where only one of the plurality of document pages includes the character string to be used as the folder name, it is desirable for the user to easily specify the folder name by using a character string included in the document and store the plurality of document pages in the folder having the name.

To address these issues, the following processing makes it possible to reduce user's work for setting a folder path by using a character string in a document, and store image data including a plurality of document pages in the same folder by using a character string on one document page.

Figure 9A:
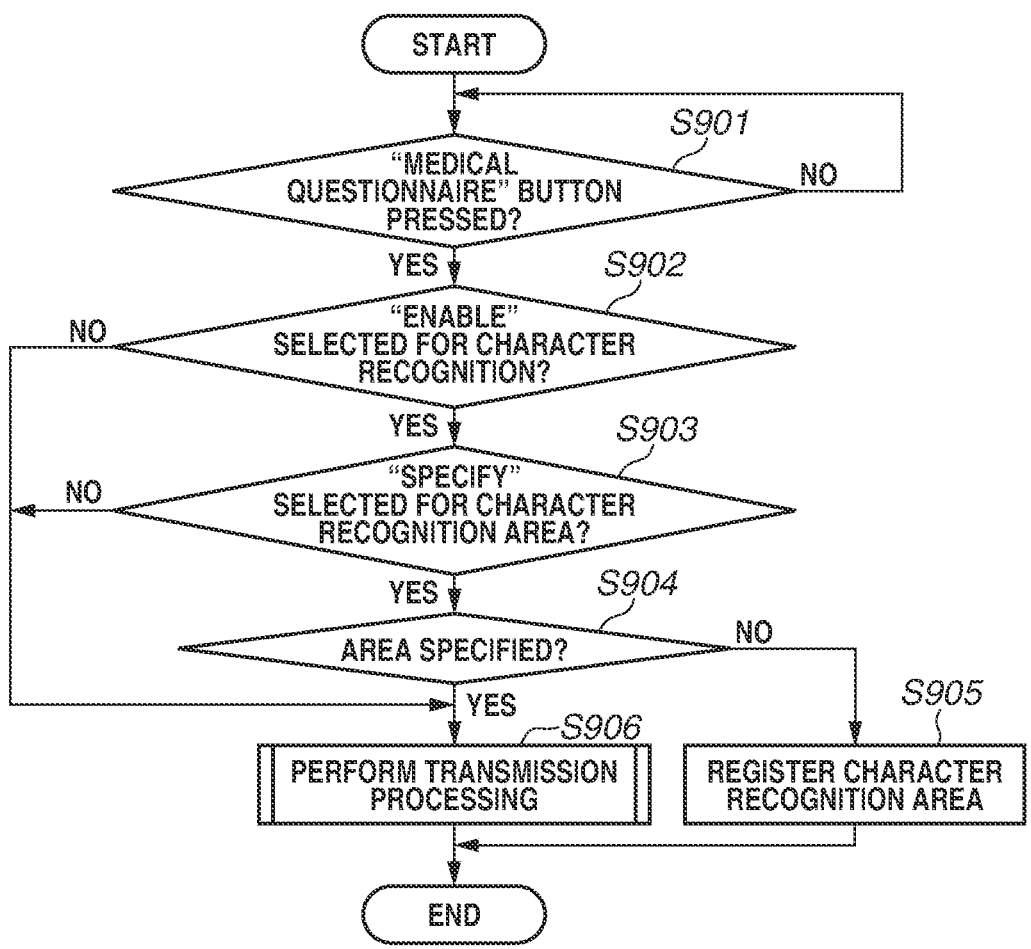
FIGS. 9A and 9B are flowcharts illustrating an example of one-touch transmission scan processing.
Figure 9B:
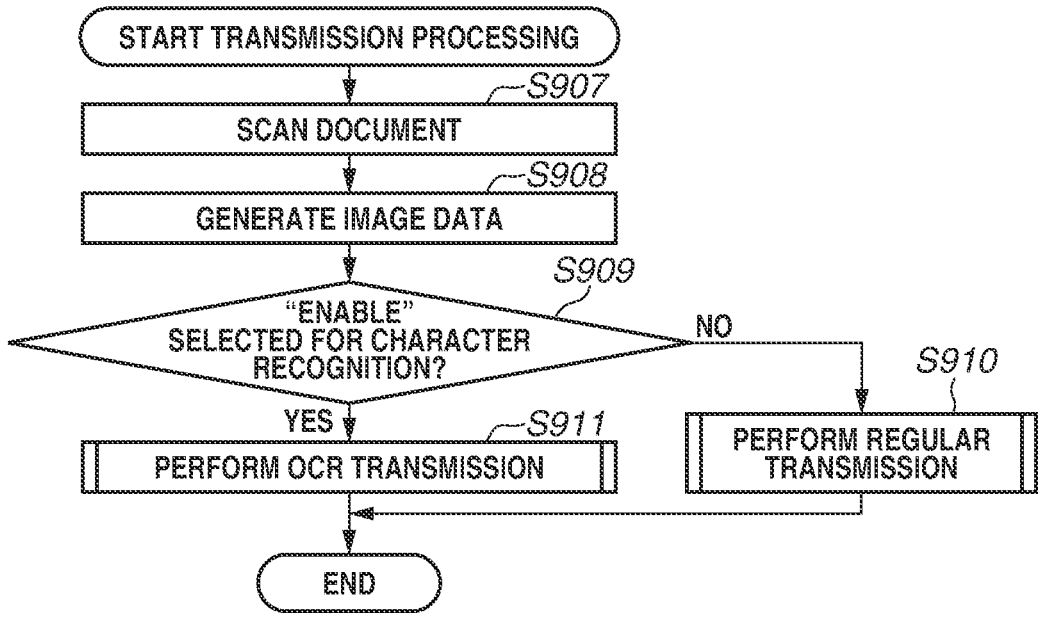

FIGS. 9A and 9B are flowcharts illustrating an example of one-touch transmission scan processing. The processing in the flowchart illustrated in FIG. 9A is implemented by the CPU 201 loading a program stored in the ROM 202 into the RAM 203 and executing the loaded program. The flowchart illustrated in FIG. 9A is started when a Home screen 400 is displayed on the touch panel 300.

The flowchart illustrated in FIG. 9A will be described below. In step S901, the CPU 201 determines whether the Medical Questionnaire button 405 is selected. If the CPU 201 determines that the Medical Questionnaire button 405 is selected (YES in step S901), the processing proceeds to step S902. If the CPU 201 determines that the Medical Questionnaire button 405 is not selected (NO in step S901), the processing returns to step S901.

In step S902, the CPU 201 determines whether "Enable" is selected from the pull-down menu 704 illustrated in FIG. 7A. If "Enable" is selected (YES in step S902), the processing proceeds to step S903. If "Enable" is not selected (NO in step S902), the processing proceeds to step S906.

In step S903, the CPU 201 determines whether "Specify" is selected from the area 705 illustrated in FIG. 7A. If the CPU 201 determines that "Specify" is selected (YES in step S903), the processing proceeds to step S904. If the CPU 201 determines that "Specify" is not selected (NO in step S903), the processing proceeds to step S906.

In step S904, the CPU 201 determines whether information regarding the character recognition area is stored in the storage 204. If the CPU 201 determines that the information regarding the character recognition area is stored in the storage 204 (YES in step S904), the processing proceeds to step S906. If the CPU 201 determines that the information regarding the character recognition area is not stored in the storage 204 (NO in step S904), the processing proceeds to step S905.

In step S905, the CPU 201 performs processing for registering the character recognition area. The processing for registering the character recognition area can be implemented by replacing transmission processing in step S1210 illustrated in FIG. 12 with processing for registering the character recognition area. More specifically, coordinate information for the character string (text object) selected by the user is stored in the storage 204, and the coordinate information is to be used in performing a one-touch transmission scan next time (when "Specify" is selected from the pull-down menu 705). If the processing for registering the character recognition area is completed, the CPU 201 ends the processing.

In step S906, the CPU 201 performs transmission processing for transmitting image data generated by scanning a document. The transmission processing will be described in detail below with reference to FIGS. 9A and 9B. When the transmission processing is completed, the CPU 201 ends the processing.

FIG. 9B is a flowchart illustrating an example of the transmission processing in step S906 illustrated in FIG. 9A. The flowchart illustrated in FIG. 9B is implemented by the CPU 201 loading a program stored in the ROM 202 into the RAM 203 and executing the loaded program. The flowchart illustrated in FIG. 9B is started if the CPU 201 determines that the information relating to the character recognition area is stored in the storage 204 in step S904 or if the CPU 201 determines that "Enable" is not selected in step S902.

In step S907, the CPU 201 controls the scanner 207 to scan an image of a document set on the scanner 207.

In step S908, the CPU 201 generates image data based on the image scanned in step S907.

In step S909, the CPU 201 determines whether "Enable" is selected from the pull-down menu 704 illustrated in FIG. 7A. If the CPU 201 determines that "Enable" is selected (YES in step S909), the processing proceeds to step S911. If the CPU 201 determines that "Enable" is not selected (NO in step S909), the processing proceeds to step S910.

In step S910, the CPU 201 performs regular transmission processing. The regular transmission processing will be described in detail below with reference to FIG. 10.

In step S911, the CPU 201 performs OCR transmission processing. An example of the OCR transmission processing will be described below with reference to FIG. 12.

Figure 10:
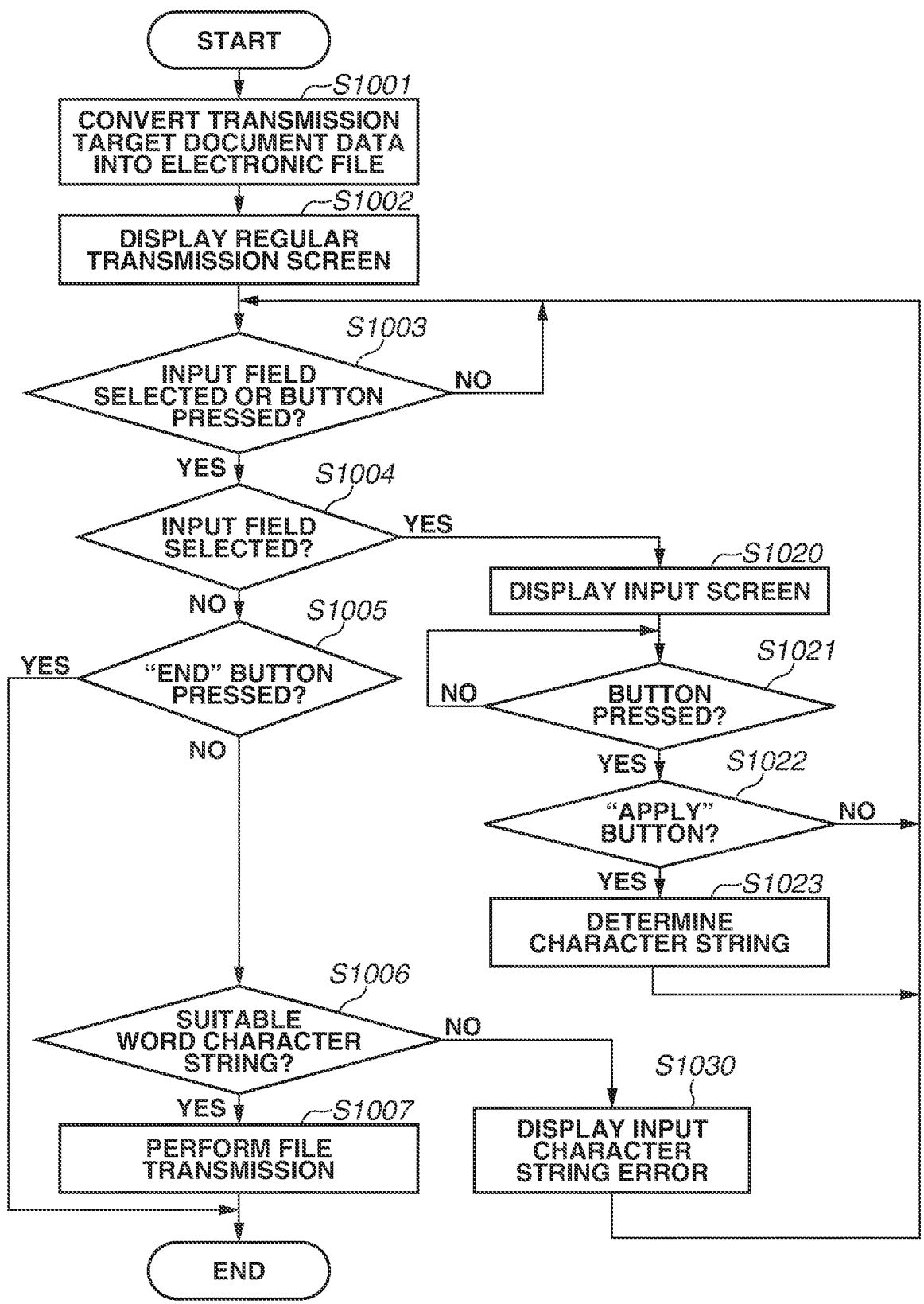
FIG. 10 is a flowchart illustrating an example of regular transmission processing.

FIG. 10 is a flowchart illustrating an example of regular transmission processing. The processing in the flowchart illustrated in FIG. 10 is implemented by the CPU 201 loading a program stored in the ROM 202 into the RAM 203 and executing the loaded program. The flowchart illustrated in FIG. 10 is started when the CPU 201 determines that "Enable" is not selected from the pull-down menu 704 illustrated in FIG. 7A in step S909 illustrated in FIG. 9B.

In step S1001, the CPU 201 generates an electronic file including all of the image data generated in step S908. The format of the generated electronic file corresponds to the format selected from the pull-down menu 611. According to the present exemplary embodiment, a PDF file is generated since "PDF" is selected from the pull-down menu 611.

In step S1002, the CPU 201 controls the operation unit 205 to display a regular transmission screen. An example of the regular transmission screen displayed is illustrated in FIG. 11A.

Figure 11A:
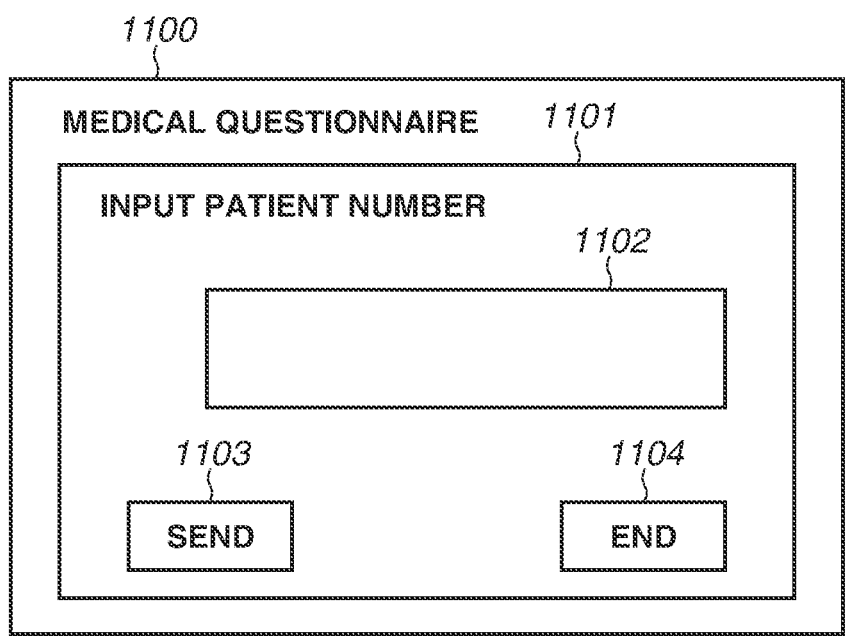
FIGS. 11A and 11B illustrate examples of regular transmission screens.
Figure 11B:
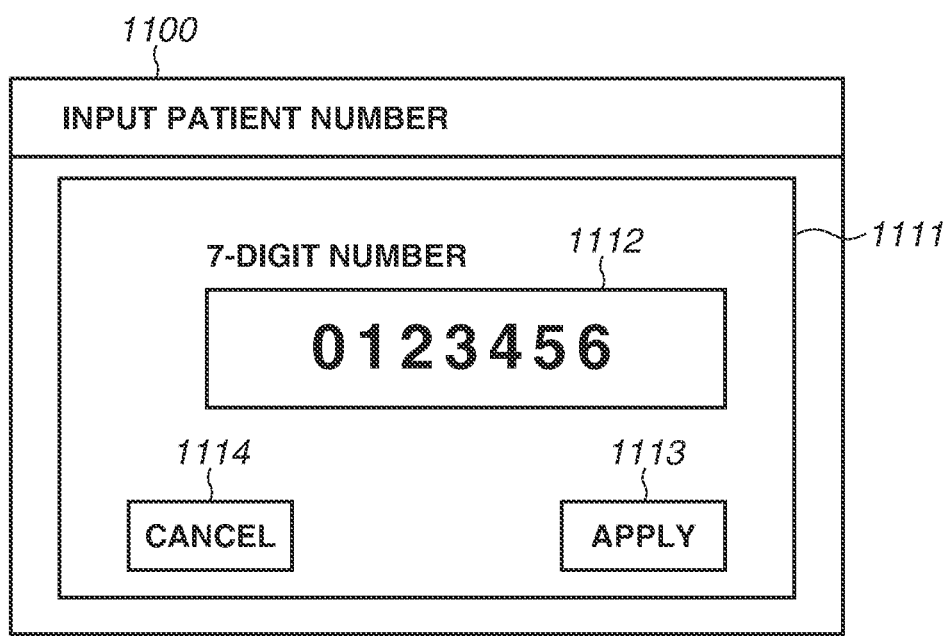

FIG. 11A illustrates an example of the regular transmission screen. A regular transmission screen 1100 illustrated in FIG. 11A is displayed on the operation unit 205. A message area 1101 is an area where the character string input in the input field 703 is displayed. According to the present exemplary embodiment, a message "Input Patient Number" is displayed. An input field 1102 is used to specify the name of the folder for storing image data generated by scanning a document. According to the present exemplary embodiment, the input patient number is used as the folder name. When the input field 703 is selected, an input screen 1110 illustrated in FIG. 11B is displayed on the operation unit 205.

The input screen 1110 is a screen for receiving a keyword input. A message area 1111 is an area for displaying the character type and the number of characters set in the pull-down menu 701 and the input field 702. An input field 1112 is used to receive a keyword input, i.e., a 7-digit number. Here, an input exceeding the set number of characters or an input different from the set character type may be rejected. Alternatively, such an input may be once received and an error is notified. An Apply button 1113 is used for reflecting, when selected by the user, the character string which has been entered up to this timing to the input field 1102. In addition, the character string is stored in the RAM 203 or the storage 204. A Cancel button 1114 is used for closing the input screen 1110 without storing the character string input in the input field 1112 when selected by the user.

A Send button 1103 is used for sending image data generated by scanning a document into a folder indicated by a folder path, when selected by the user. The folder path is a combination of the folder path (destination) being displayed in the area 609 and the character string being displayed in the input field 1102 with the character string added to the one lower level of the folder path. More specifically, the image data is transmitted (stored) into the folder indicated by a folder path "\\file_server\medical_questionnaire\0123456". The transmission destination (storage destination) of electronic data (image data) in this transmission processing may be the storage 204 within the MFP 101.

An End button 1104 is used for canceling the transmission processing and closing the regular transmission screen 1100, when selected by the user.

Referring back to the flowchart in FIG. 10, in step S1003, the CPU 201 determines whether a button or an input field displayed on the regular transmission screen 1100 is selected by the user. If the CPU 201 determines that a button or an input field is selected (YES in step S1003), the processing proceeds to step S1004. If the CPU 201 determines that a button or an input field is not selected (NO in step S1003), the processing returns to step S1003, and the CPU 201 repeats the operation in step S1003.

In step S1004, the CPU 201 determines whether the input field 1102 is selected. If the CPU 201 determines that the input field 1102 is selected (YES in step S1004), the processing proceeds to step S1020. If the CPU 201 determines that the input field 1102 is not selected (NO in step S1004), the processing proceeds to step S1005.

In step S1005, the CPU 201 determines whether the End button 1104 is selected. If the CPU 201 determines that the End button 1104 is selected (YES in step S1005), the CPU 201 ends the processing. If the CPU 201 determines that the End button 1104 is not selected (NO in step S1005), i.e., if the Send button 1103 is selected, the processing proceeds to step S1006.

In step S1006, the CPU 201 determines whether the character string being displayed in the input field 1102 satisfies the conditions (character type and the number of characters) set in the pull-down menu 701 and the input field 702. If the CPU 201 determines that the character string satisfies the conditions (YES in step S1006), the processing proceeds to step S1007. If the CPU 201 determines that the character string does not satisfy the conditions (NO in step S1006), the processing proceeds to step S1030.

In step S1030, the CPU 201 controls the operation unit 205 to display error information indicating that the input character string does not satisfy the conditions.

In step S1007, the CPU 201 controls the network OF 208 to send the electronic file generated in step S1001 to the folder indicated by the folder path as a combination of the folder path (destination) being displayed in the area 609 and the character string being displayed in the input field 1102 with the character string added to the one lower level of the folder path. In this case, the CPU 201 generates the destination folder before sending the electronic file. The file name of an electronic file may be any name as long as it is unique. For example, if the processing in step S1007 is started at 12:23:56 on Oct. 10, 2018, the file name becomes 20181010122356.pdf.

A case where the CPU 201 determines that the input field 1102 is selected in step S1004 (YES, in step S1104) will be described below. In step S1020, the CPU 201 controls the operation unit 205 to display the input screen 1110.

In step S1021, the CPU 201 determines whether a button is selected. If the CPU 201 determines that a button is selected (YES in step S1021), the processing proceeds to step S1022. If the CPU 201 determines that a button is not selected (NO in step S1021), the processing returns to step S1021.

In step S1022, the CPU 201 determines whether the Apply button 1113 is selected. If the CPU 201 determines that the Apply button 1113 is selected (YES in step S1022), the processing proceeds to step S1023. If the CPU 201 determines that the Apply button 1113 is not pressed (NO in step S1022), the processing returns to step S1003.

In step S1023, the CPU 201 stores the character string input to the input field 1112 in the RAM 203 or the storage 204, and controls the operation unit 205 to close the input screen 1110 and display the regular transmission screen 1100. The CPU 201 then controls the operation unit 205 to display the stored character string in the input field 1102.

Figure 12:
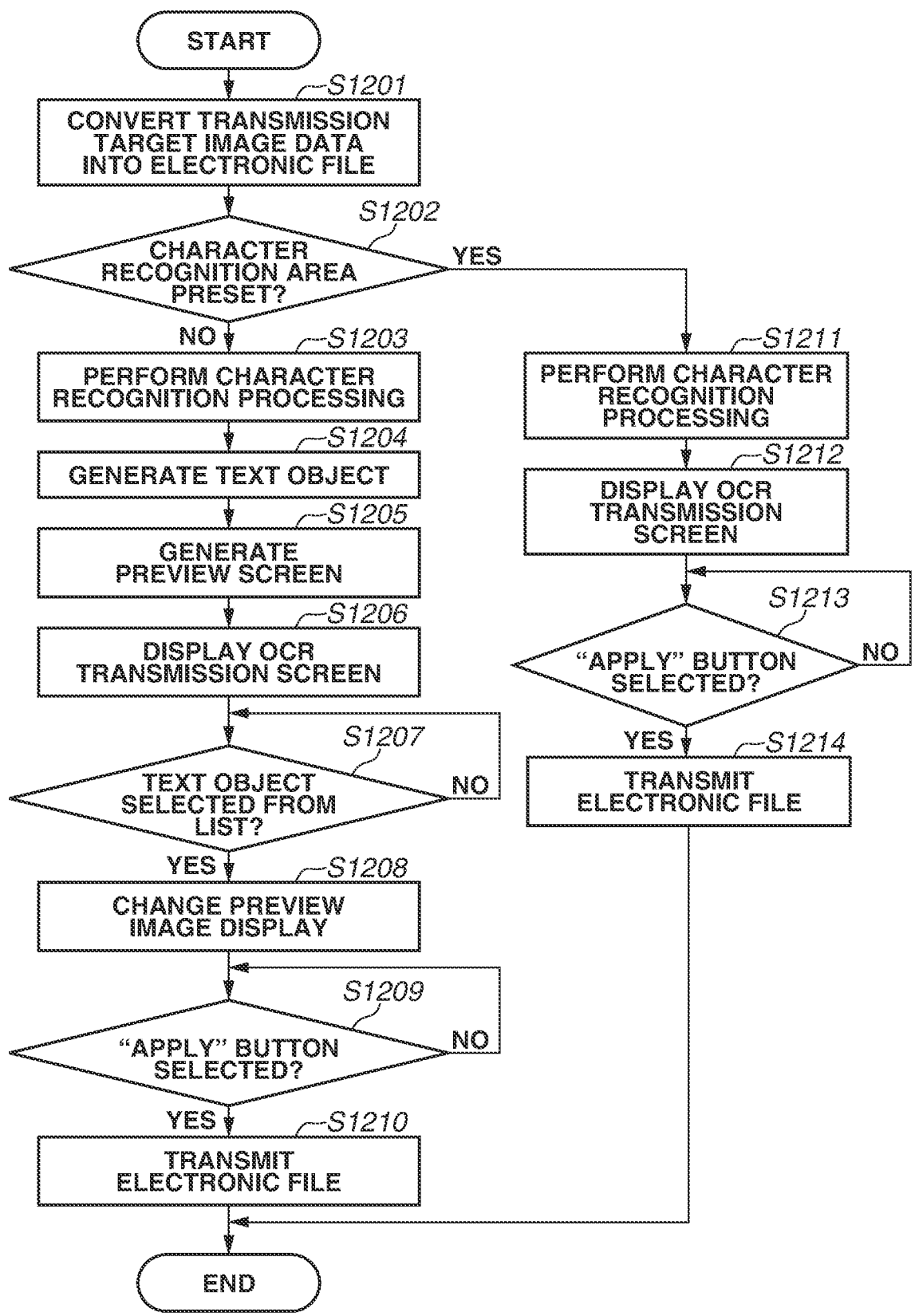
FIG. 12 is a flowchart illustrating an example of optical character recognition (OCR) transmission processing.

FIG. 12 is a flowchart illustrating an example of the OCR transmission processing. The processing in the flowchart illustrated in FIG. 12 is implemented by the CPU 201 loading a program stored in the ROM 202 into the RAM 203 and executing the loaded program. The flowchart illustrated in FIG. 12 is started when the CPU 201 determines that "Enable" is selected from the pull-down menu 704 illustrated in FIG. 7A in step S909 illustrated in FIG. 9B.

In step S1201, the CPU 201 generates an electronic file based on the image data generated in step S908. At this timing, the CPU 201 may generate one electronic file including all of the generated image data or a plurality of electronic files including image data corresponding to an optional number of document pages in response to receiving a single scanning instruction. In this case, the format of the generated electronic file corresponds to the format selected from the pull-down menu 611. According to the present exemplary embodiment, a PDF file is generated since "PDF" is selected from the pull-down menu 611.

In step S1202, the CPU 201 determines whether a character recognition area is preset. If the CPU 201 determines that a character recognition area is preset (YES in step S1202), the processing proceeds to step S1211. If the CPU 201 determines that a character recognition area is not preset (NO in step S1202), the processing proceeds to step S1203.

In step S1203, the CPU 201 performs the character recognition processing on the image data generated in step S908. At this timing, the image data to be subjected to the character recognition processing is the image data relating to the document first scanned in step S907. More specifically, with one scanning instruction, only the image data corresponding to the first document (page) out of the scanned document pages is subjected to the character recognition processing.

While the present exemplary embodiment has been described above centering on an example where the character recognition processing is performed only on the image data relating to the first page, the present disclosure is not limited thereto. Only the document page at an optional position set by the user may be subjected to the character recognition processing. For example, when 2 is set in an input field 1501 on a keyword string setting screen 1500 illustrated in FIG. 15, the image data corresponding to the second page is subjected to the character recognition processing. In this way, the CPU 201 can receive a setting regarding which document page number the image data including a character string to be recognized corresponds to.

Figure 15:
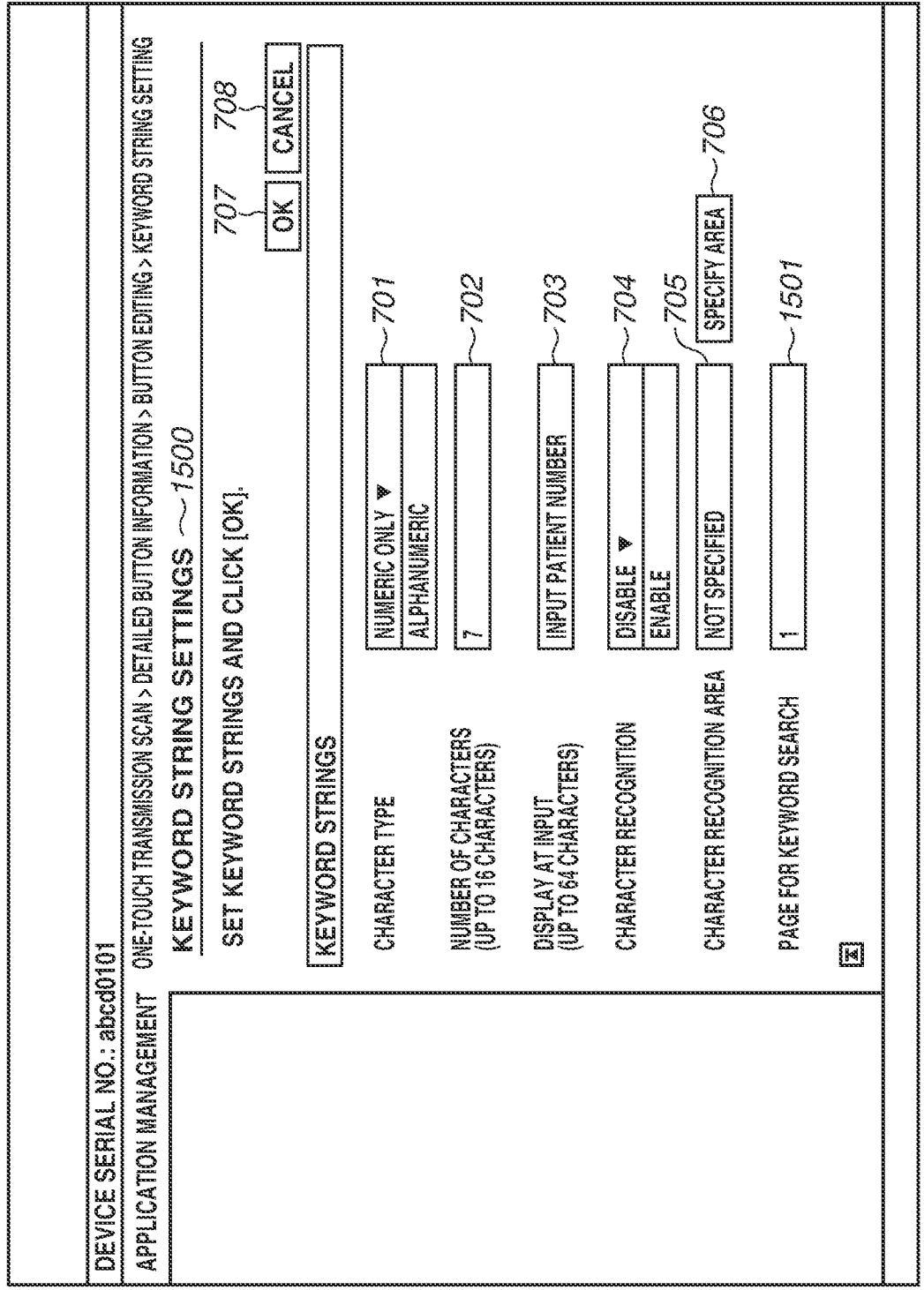
FIG. 15 illustrates an example of a keyword string setting screen.

FIG. 15 illustrates an example of a keyword string setting screen. The keyword string setting screen 1500 includes the screen for setting keyword strings illustrated in FIG. 7A and the additional input field 1501 for specifying the page to be subjected to keyword search.

The input field 1501 is used for receiving a numerical value input by the user. The character recognition processing is performed at the position of the document page corresponding to the numeric value input to the input field 1501.

In step S1204, the CPU 201 generates a text object by using a character string obtained as a result of the character recognition processing in step S1203. Area information for the character string corresponding to the text object is supplied to this text object.

In step S1205, the CPU 201 generates a preview image to be displayed on the operation unit 205, based on the generated image data.

In step S1206, the CPU 201 displays an OCR transmission screen by using the text object and the preview image generated in steps S1204 and S1205, respectively. An example of the OCR transmission screen is illustrated in FIG. 13.

Figure 13:
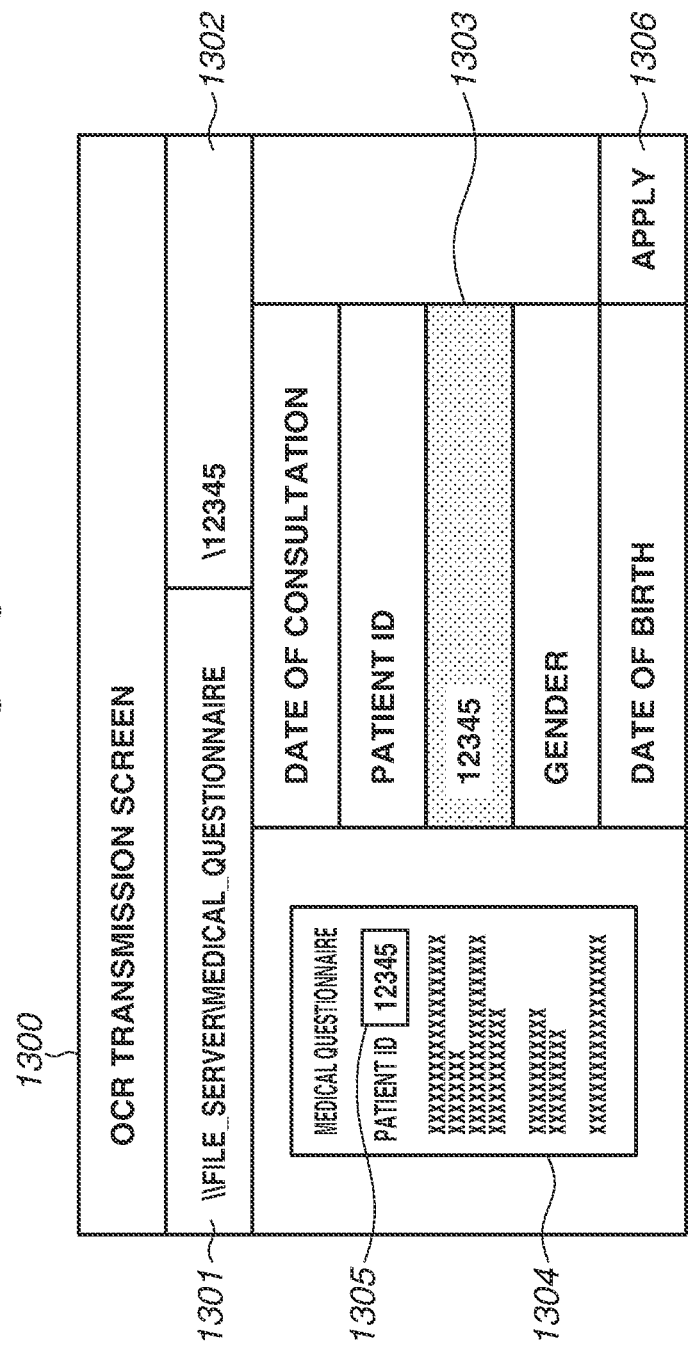
FIG. 13 illustrates an example of an OCR transmission screen.

FIG. 13 illustrates an example of the OCR transmission screen. An area 1301 displays the folder path selected in the address selection screen 800.

An area 1302 displays the character string indicated by the text object selected from a list 1303. The character string indicated by the selected text object is stored in the RAM 203. Referring to FIG. 13, since a text object indicating "12345" is selected, "\" and "12345" are displayed in the area 1302. The selected text object is highlighted. The character string on a preview image 1304 is also highlighted, as indicated by an area 1305.

The list 1303 is used for displaying the text object generated in step S1204, for example. The list 1303 displays text objects from the text object corresponding to the upper left character clipping rectangle to the text object corresponding to the lower right rectangle.

An Apply button 1306 is used for sending, when selected by the user, the generated electronic file to the folder indicated by the folder path as a combination of the folder path being displayed in the area 1301 and the character string being displayed in the area 1302 with the character string added to the lowest level of the folder path. In the example illustrated in FIG. 13, electronic data is sent to the folder specified by the folder path "\\file_server\medical_questionnaire\12345".

Referring back to the flowchart illustrated in FIG. 12, in step S1207, the CPU 201 determines whether a text object is selected from the list 1303 via the operation unit 205 by the user. If the CPU 201 determines that a text object is selected (YES in step S1207), the processing proceeds to step S1208. If the CPU 201 determines that no text object is selected (NO in step S1207), the processing returns to step S1207.

In step S1208, the CPU 201 highlights the area corresponding to the text object selected in step S1207, on preview image 1305, and changes the display of the character string in the area 1301.

In step S1209, the CPU 201 determines whether the Apply button 1306 is selected. If the CPU 201 determines that the button is selected (YES in step S1209), the processing proceeds to step S1210. If the CPU 201 determines that the button is not selected (NO in step S1209), the processing returns to step S1209.

In step S1210, the CPU 201 sends the generated electronic file to the file specified by the folder path as a combination of the folder path being displayed in the area 1301 and the character string being displayed in the area 1302 with the character string added to the lowest level of the folder path.

A case where the CPU 201 determines that a character recognition area is set in step S1202 will be described below. In step S1211, the CPU 201 performs the character recognition processing on the preset character recognition area to acquire a character string.

In step S1212, the CPU 201 controls the operation unit 205 to display an OCR transmission screen 1400 for displaying the character string acquired in step S1211.

Figure 14:
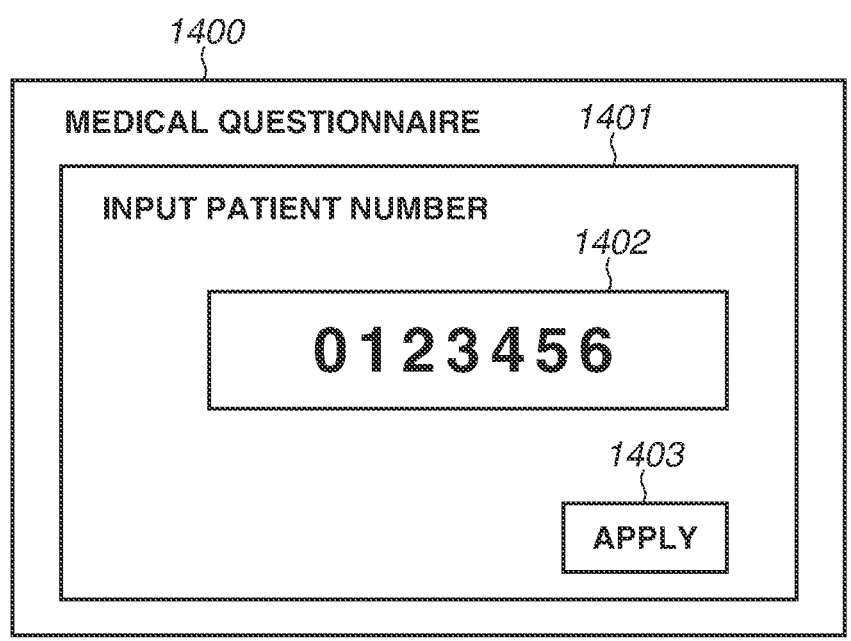
FIG. 14 illustrates another example of an OCR transmission screen.

FIG. 14 illustrates an example of the OCR transmission screen 1400. A message area 1401 displays the character string input in the input field 703. According to the present exemplary embodiment, a message "Input Patient Number" is displayed.

An input field 1402 is used to specify the name of the folder for storing image data generated by scanning a document. According to the present exemplary embodiment, an input patient number is used as the folder name According to the present exemplary embodiment, since a character recognition area is preset, a character string included in the character recognition area is extracted and then displayed in the input field 1402.

An Apply button 1403, when selected by the user, sends the generated electronic file to the folder indicated by the folder path as a combination of the folder path selected in the address selection screen 800 and the character string being displayed in the input field 1402 with the character string added to the lowest level of the folder path.

When the OCR transmission screen 1400 is displayed, the CPU 201 receives a character string input to the input field 1402 by the user.

Referring back to the flowchart illustrated in FIG. 12, in step S1213, the CPU 201 determines whether the Apply button 1403 is selected by the user. If the CPU 201 determines that the button is selected (YES in step S1213), the processing proceeds to step S1214. If the CPU 201 determines that the button is not pressed (NO in step S1213), the processing returns to step S1213.

In step S1214, the CPU 201 sends the generated electronic file to the folder indicated by the folder path as a combination of the folder path set in the area 609 and the character string being displayed or input in the input field 1402 with the character string added to the lowest level of the folder path.

The above-described processing reduces user's work in setting a folder path using a character string in a document, thus enabling image data including a plurality of document pages to be stored in the same folder by using a character string on one document page.

Figure 16A:
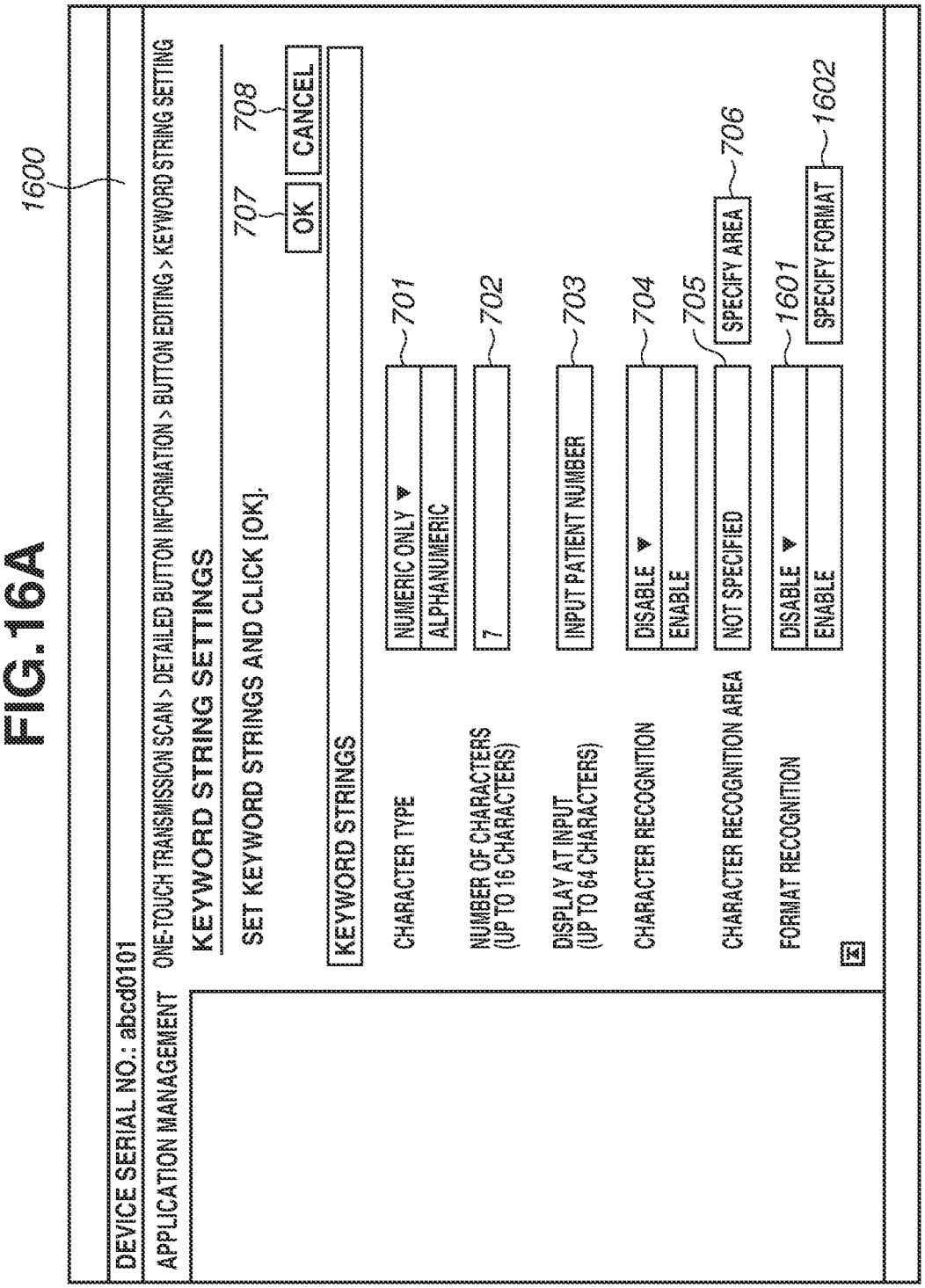
FIGS. 16A and 16B illustrate examples of setting screens for the OCR transmission processing.
Figure 16B:
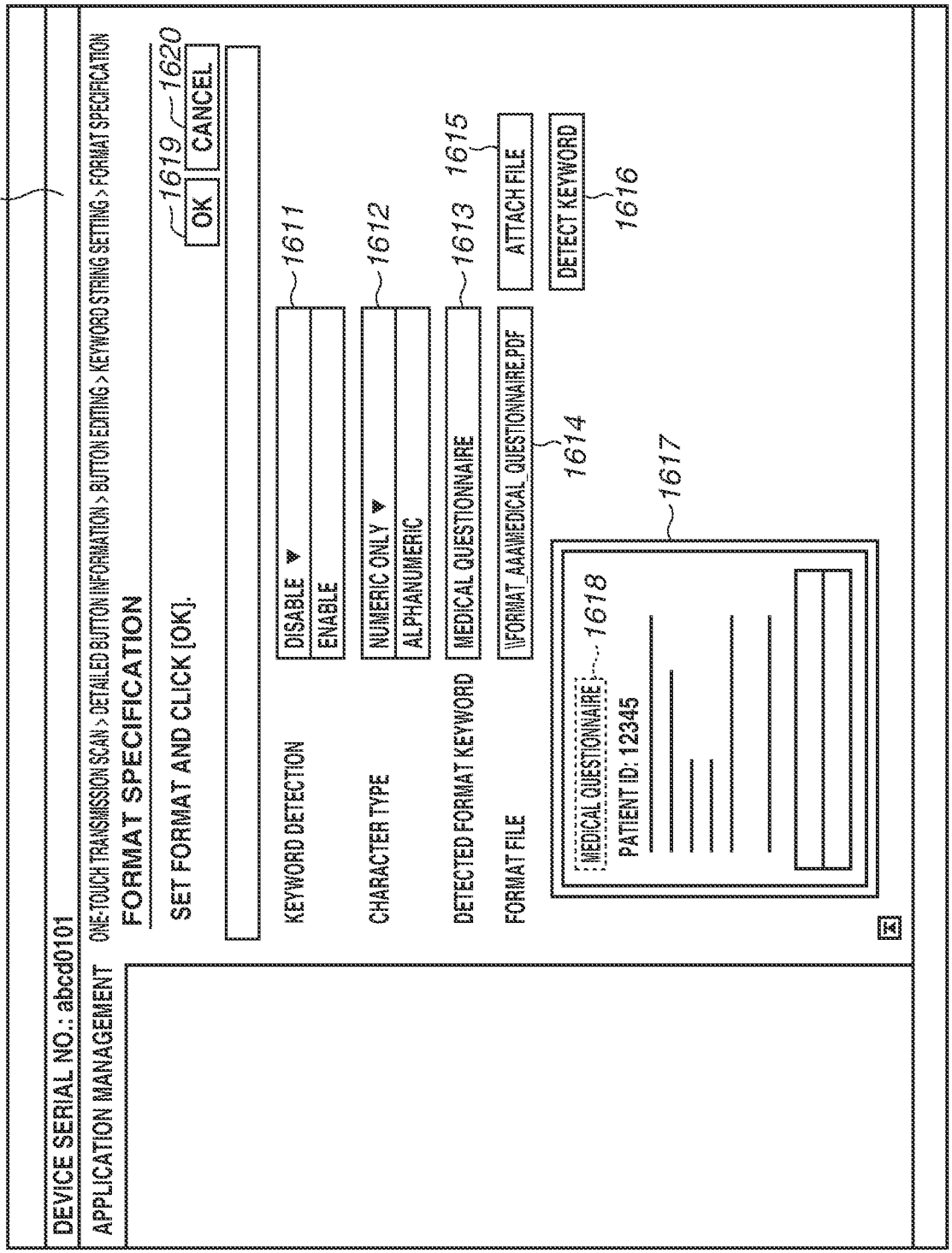

A second exemplary embodiment of the present disclosure will be described below. FIGS. 16A and 16B illustrate examples of setting screens for the OCR transmission processing. The screen illustrated in FIG. 16A includes the screen for setting keyword strings illustrated in FIG. 7A and an additional pull-down menu 1601 for registering a keyword registration format. If image data is preregistered as a format by using the pull-down menu 1601, the user is allowed to determine whether to perform the format recognition processing in which the character recognition processing is performed only on the image data, when image data similar to the image data is generated by scanning a document. When a Format Specification button 1602 is selected, a format specification screen 1610 illustrated in FIG. 16B is displayed.

FIG. 16B illustrates an example of a setting screen for the format recognition processing. A pull-down menu 1612 is used to set a character type to be used for format determination. A button 1615 is used to select a format file to be detected. An area 1614 displays the folder path of the selected format file. When the button 1615 selected and then a format file is selected, an image is displayed in an area 1617.

The user is allowed to specify a start and an end point of a rectangular area 1618 by using a pointer. In this case, the start and end point coordinates are converted into real space distances which are temporarily stored. As specific examples of setting values, a start point (X, Y)=(10, 10) and an end point (X, Y)=(50, 20) can be set in mm.

When a Detect Keyword button 1616 is selected, the CPU 201 performs the character recognition processing on the area 1618 and displays the result in an area 1613. If the keyword has no problem, the user selects an OK button 1619, and the keyword and the coordinate information for the two points are set in a format keyword character recognition area. When a Cancel button 1620 is selected, the keyword and the coordinate information are deleted, and the processing returns to the screen illustrated in FIG. 16A.

Figure 17B:
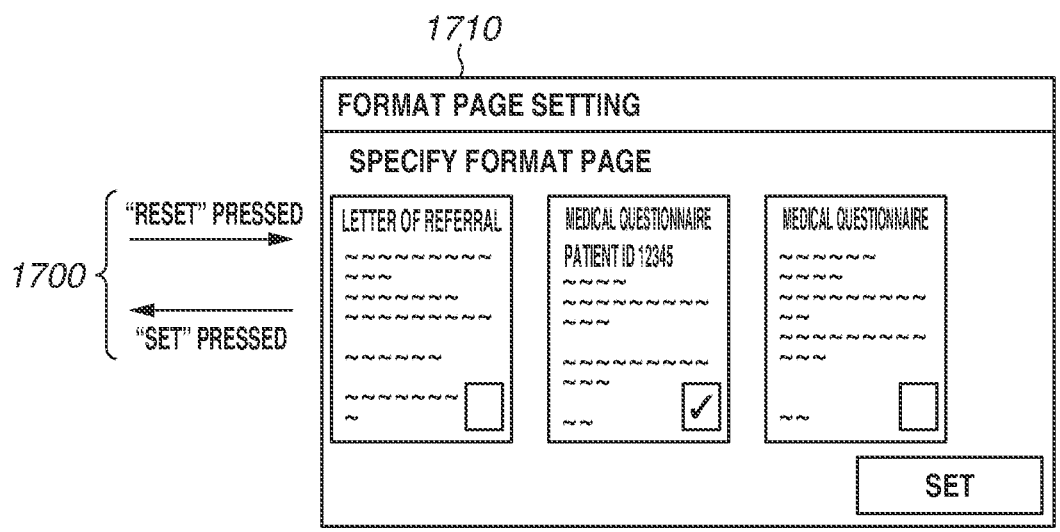

FIGS. 17A and B illustrate an example of a screen transition in a one-touch transmission scan. FIGS. 17A and 17B illustrate a screen transition in processing for detecting a character string that matches the keyword in the image of the format file from among image data regarding a document scanned by a scanner, extracting a character string to be used as the folder name, and perform sending. The screen transition illustrated in FIGS. 17A and 17B applies to a case where a character recognition area is preset as a setting of the Medical Questionnaire button 405.

When the Medical Questionnaire button 405 is selected in the Home screen 400, a confirmation screen 1700 for confirming the page to be subjected to the character recognition processing is displayed. When a Reset button is selected in the confirmation screen 1700, a character recognition page setting screen 1710 is displayed. The confirmation screen 1700 displays images corresponding to all of image data generated by scanning images of a document.

When a check box in an image is selected and then a Set button is selected in the character recognition page setting screen 1710, the page to be subjected to the character recognition processing is reset. When the Set button is selected in the character recognition page setting screen 1710, the character recognition page setting screen 1700 is redisplayed.

The character recognition page setting screen 1700 displays the preset character recognition area on the image determined to be the page to be subjected to the character recognition processing. When a Yes button is selected, the character recognition processing is performed on the set character recognition area, and the OCR transmission screen 1400 is displayed. When the Apply button 1403 is selected in the OCR transmission screen 1400, the electronic file is sent to the folder path as a combination of the preset folder path and the character string obtained through the character recognition, appended to the lowest level of the folder path.

Figure 18:
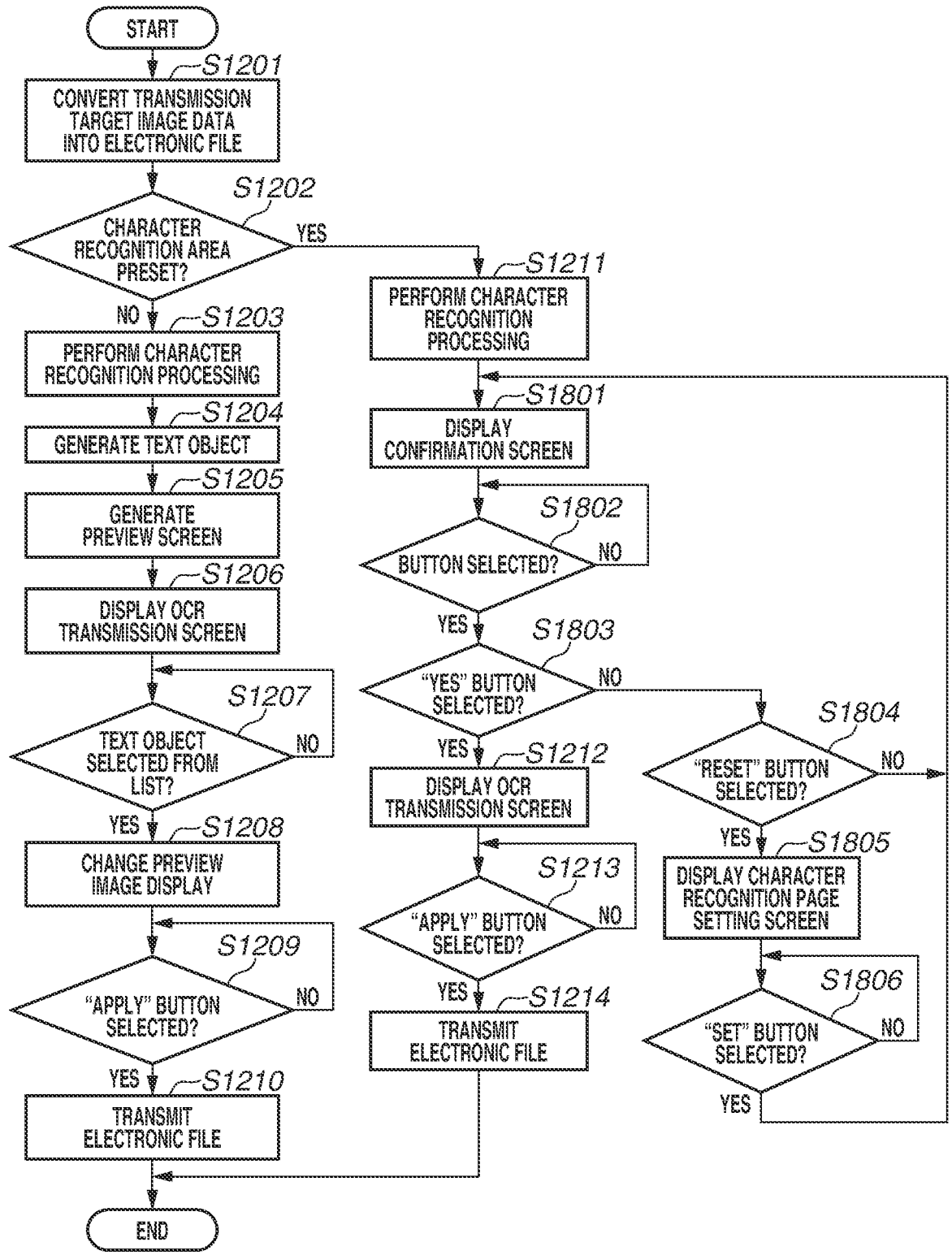
FIG. 18 is a flowchart illustrating an example of the OCR transmission processing.

FIG. 18 is a flowchart illustrating an example of the OCR transmission processing. The processing in the flowchart illustrated in FIG. 18 is implemented by the CPU 201 loading a program stored in the ROM 202 into the RAM 203 and executing the loaded program. The flowchart illustrated in FIG. 18 is started when the CPU 201 determines that "Enable" is selected from the pull-down menu 704 illustrated in FIG. 7A in step S909 illustrated in FIG. 9B.

The flowchart illustrated in FIG. 18 includes the flowchart illustrated in FIG. 12 and additional operations in steps S1801 to S1806. For operations equivalent to those illustrated FIG. 12, redundant descriptions thereof will be omitted.

In step S1801, the CPU 201 controls the operation unit 205 to display the confirmation screen 1700.

In step S1802, the CPU 201 determines whether a button in the confirmation screen 1700 is selected. If the CPU 201 determines that a button is selected (YES in step S1802), the processing proceeds to step S1803. If the CPU 201 determines that a button is not selected (NO in step S1802), the processing returns to step S1802.

In step S1803, the CPU 201 determines whether the Yes button is selected. If the CPU 201 determines that the Yes button is selected (YES in step S1803), the processing proceeds to step S1212. In step S1212, the CPU 201 displays the OCR transmission screen 1400. If the CPU 201 determines that the Yes button is not selected (NO in step S1803), the processing proceeds to step S1804.

In step S1804, the CPU 201 determines whether the Reset button is selected. If the CPU 201 determines that the Reset button is selected (YES in step S1804), the processing proceeds to step S1805. If the CPU 201 determines that the Reset button is not selected (NO in step S1804), the processing returns to step S1801.

In step S1805, the CPU 201 controls the operation unit 205 to display the character recognition page setting screen 1710 and receives a selection of an image for setting a character recognition page.

In step S1806, the CPU 201 determines whether the Set button is selected. If the CPU 201 determines that the Set button is selected (YES in step S1806), the processing proceeds to step S1801. If the CPU 201 determines that the Set button is not selected (NO in step S1806), the processing returns to step S1806.

While the present exemplary embodiment has been described above centering on an example where the confirmation screen 1700 and the character recognition page setting screen 1710 are displayed in a case where a character recognition area is set, the present disclosure is not limited thereto. For example, the confirmation screen 1700 and the character recognition page setting screen 1710 may be displayed even in a case where a character recognition area is not set. In this case, an OCR transmission screen 1300 is displayed when the Yes button is selected in the confirmation screen 1700.

The execution of the above-described processing makes it possible to perform the character recognition processing on image data about a document including the keyword in the image of the format file preset by the user to acquire a character string. The character recognition processing can be performed regardless of the order of scanning document pages subjected to character recognition.

The user can select an image of the document to be subjected to the character recognition processing while checking images of the document, thus preventing the character recognition processing from being incorrectly performed on a similar image of the document.

Figure 19A:
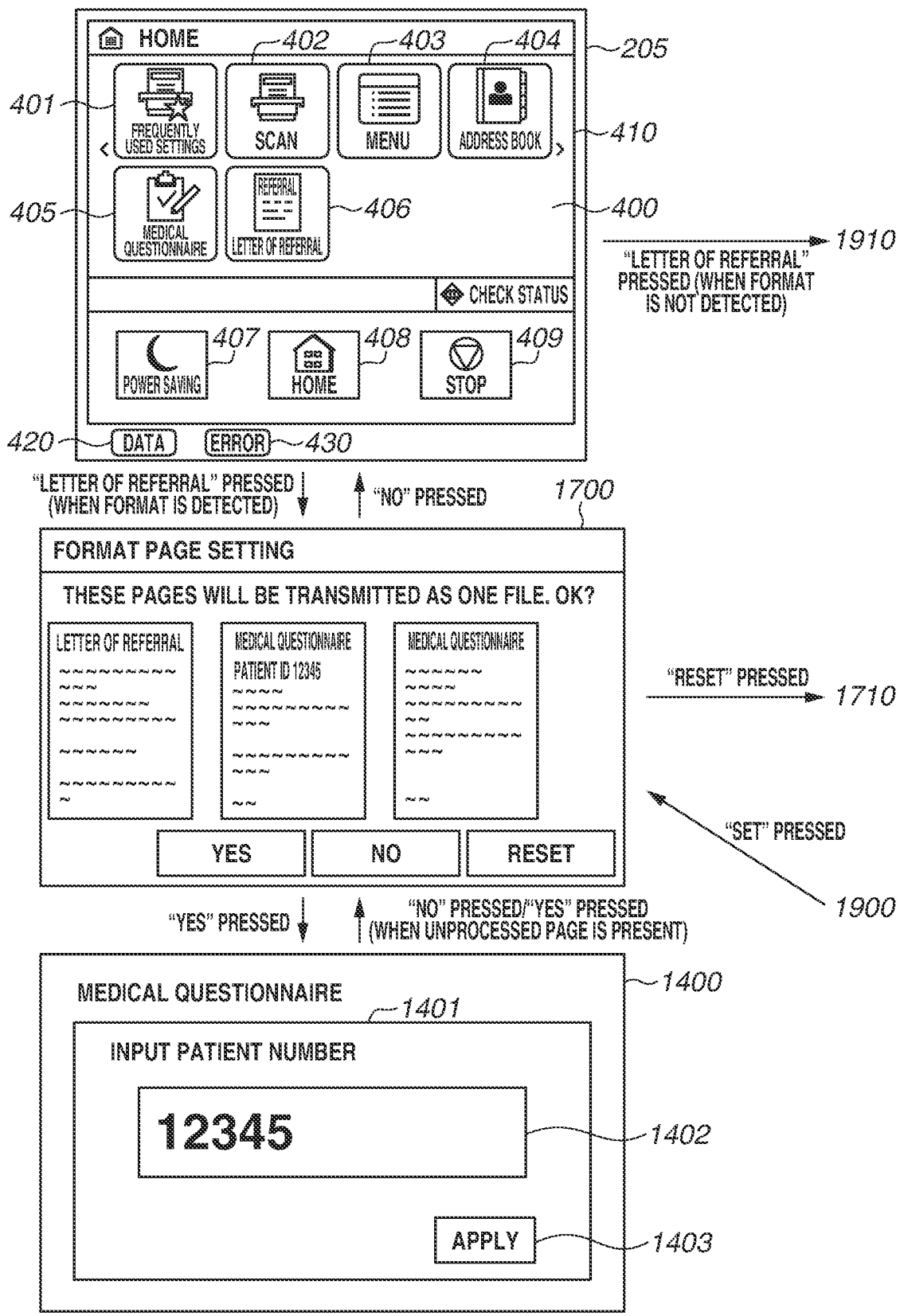

FIGS. 19A and 19B illustrate an example of a screen transition in a one-touch transmission scan. FIGS. 19A and 19B illustrate a screen transition in processing for dividing image data relating to a document scanned by a scanner and transmits image data. The screens illustrated in FIGS. 19A and 19B are displayed on the operation unit 205.

Differences in the screen transition between that illustrated in FIGS. 19A and 19B and that illustrated in FIGS. 17A and 17B will be described below. When the Medical Questionnaire button 405 is selected, images of a document are scanned. The confirmation screen 1700 displays only a part of the images corresponding to the image data. More specifically, the confirmation screen 1700 displays images corresponding to the document for one page before and one page after the image data of the document including the keyword in the image of the format file.

When the Yes button is selected, the electronic file including the image data corresponding to the displayed image is sent to the folder indicated by the folder path as a combination of the preset folder path and the character string acquired from within the image data about the document including the keyword in the image of the format file with the character string added to the lowest level of the folder path. If there is image data not having been transmitted after completion of the transmission processing, the CPU 201 redisplays the confirmation screen 1700 and displays the next image.

When the Set button is selected in the character recognition page setting screen 1710, a last page setting screen 1900 is displayed. The last page setting screen 1900 is used to determine the number of pieces of image data to be transmitted at one time. For example, when the image of the second page currently displayed is selected on the last page setting screen 1900, the second page becomes the last page. More specifically, only images of the first and the second pages are displayed on the confirmation screen 1700.

In a case where the CPU 201 determines that, when the Medical Questionnaire button 405 is selected, the keyword in the image of the format file is not included in image data generated by scanning a document, an OCR transmission screen 1910 is displayed on the operation unit 205.

Figure 20:
FIG. 20 includes FIGS. 20A and 20B which are another flowchart illustrating an example of the OCR transmission processing.
Figure 20A:
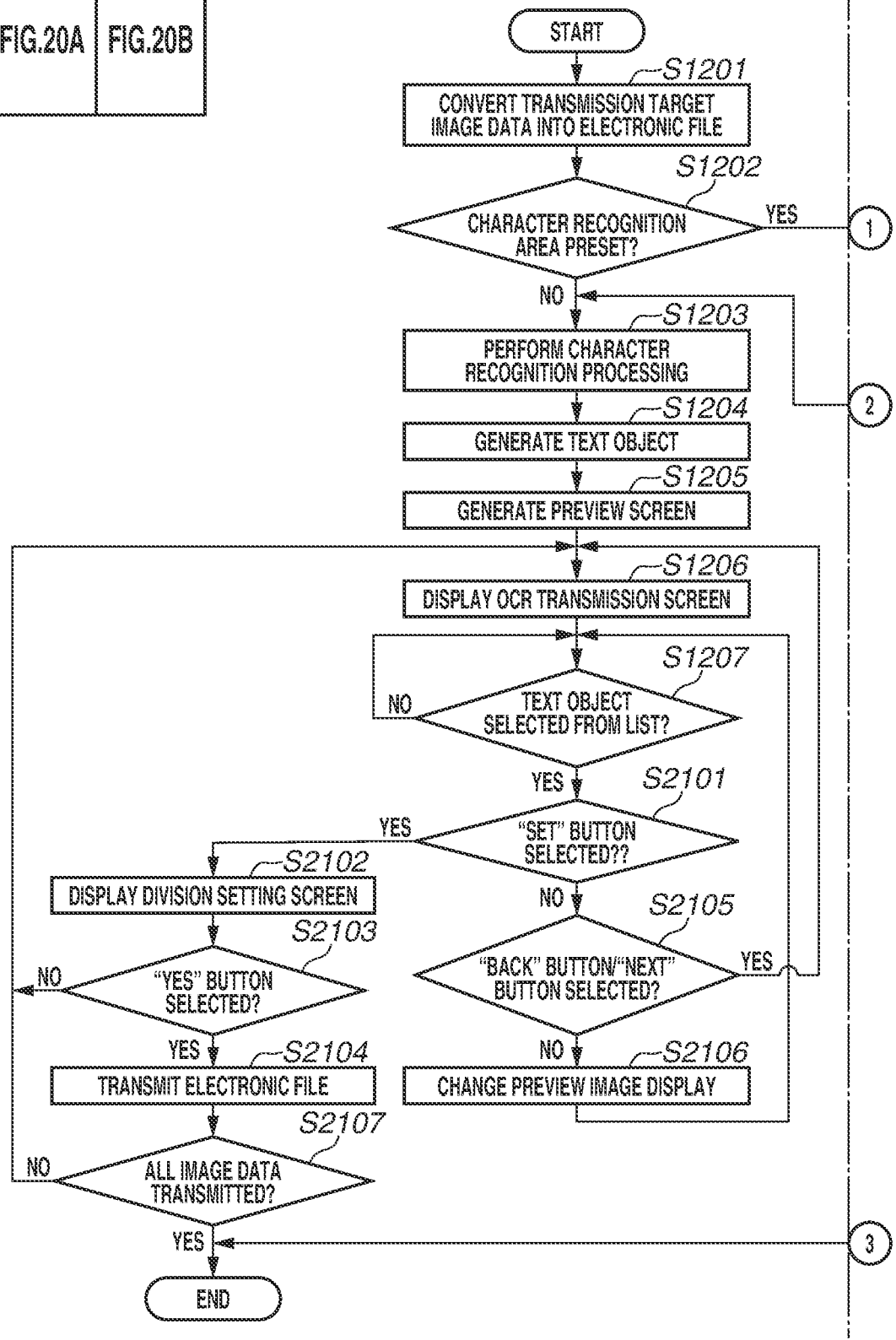
Figure 20B:
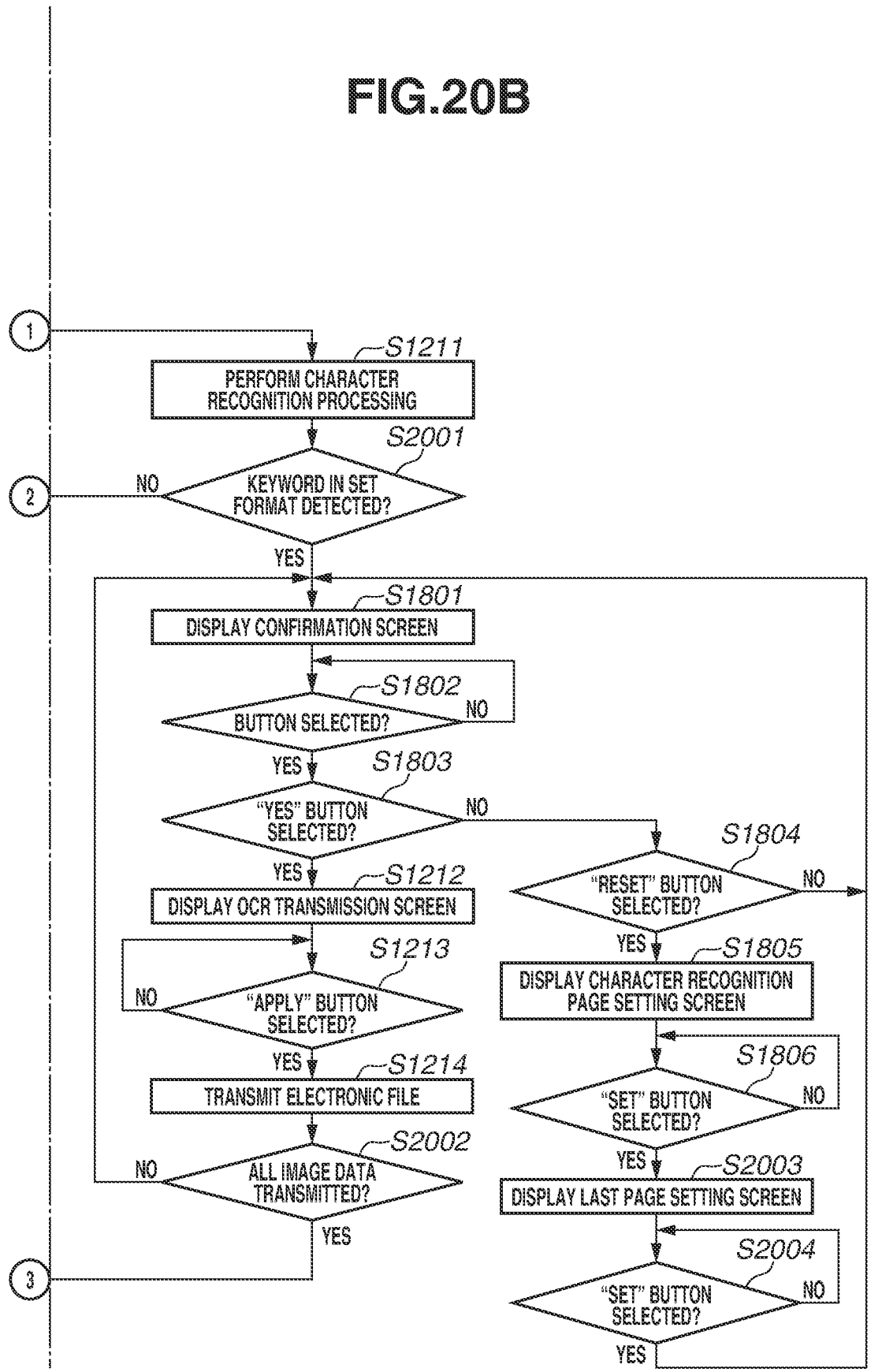

FIGS. 20A and 20B are a flowchart illustrating an example of the OCR transmission processing. The processing in the flowchart illustrated in FIGS. 20A and 20B is implemented by the CPU 201 loading a program stored in the ROM 202 into the RAM 203 and executing the loaded program. The flowchart illustrated in FIGS. 20A and 20B is started when the CPU 201 determines that "Enable" is selected from the pull-down menu 704 illustrated in FIG. 7A in step S909 illustrated in FIG. 9B.

The flowchart illustrated in FIGS. 20A and B includes the flowchart illustrated in FIG. 18 and additional processing in steps S2001 to S2004 and S2101 to S2106. For processing equivalent to that illustrated FIGS. 12 and 18, redundant descriptions thereof will be omitted.

In step S2001, the CPU 201 determines whether the keyword of the image of the format file set in the area 1618 is detected in the generated image data. If the CPU 201 determines that the keyword is detected (YES in step S2001), the processing proceeds to step S1801. If the CPU 201 determines that the keyword is not detected (NO in step S2001), the processing proceeds to step S1203. In step S1203, the CPU 201 performs the character recognition processing.

In step S2002, the CPU 201 determines whether all of the generated image data has been transmitted. If the CPU 201 determines that all of the generated image data has been transmitted (YES in step S2002), the CPU 201 ends the processing. If the CPU 201 determines that not all of the generated image data has been transmitted (NO in step S2002), the processing returns to step S1801.

In step S2003, the CPU 201 controls the operation unit 205 to display the last page setting screen 1900. In the last page setting screen 1900, the CPU 201 receives a selection of the last page to determine the number of pieces of image data to be transmitted at one time. A set of the image data to be transmitted at one time determined by the accepted selection is highlighted.

In step S2004, the CPU 201 determines whether the Set button is selected. If the CPU 201 determines that the Set button is selected (YES in step S2004), the processing returns to step S1801. If the CPU 201 determines that the Set button is not selected (NO in step S2004), the processing returns to step S2004.

In step S2101, the CPU 201 determines whether the Set button is selected in the OCR transmission screen 1910. If the CPU 201 determines that the Set button is selected (YES in step S2101), the processing proceeds to step S2102. If the CPU 201 determines that the Set button is not selected (NO in step S2101), the processing proceeds to step S2105.

In step S2102, the CPU 201 controls the operation unit 205 to display a division setting screen 2100.

Figure 21B:
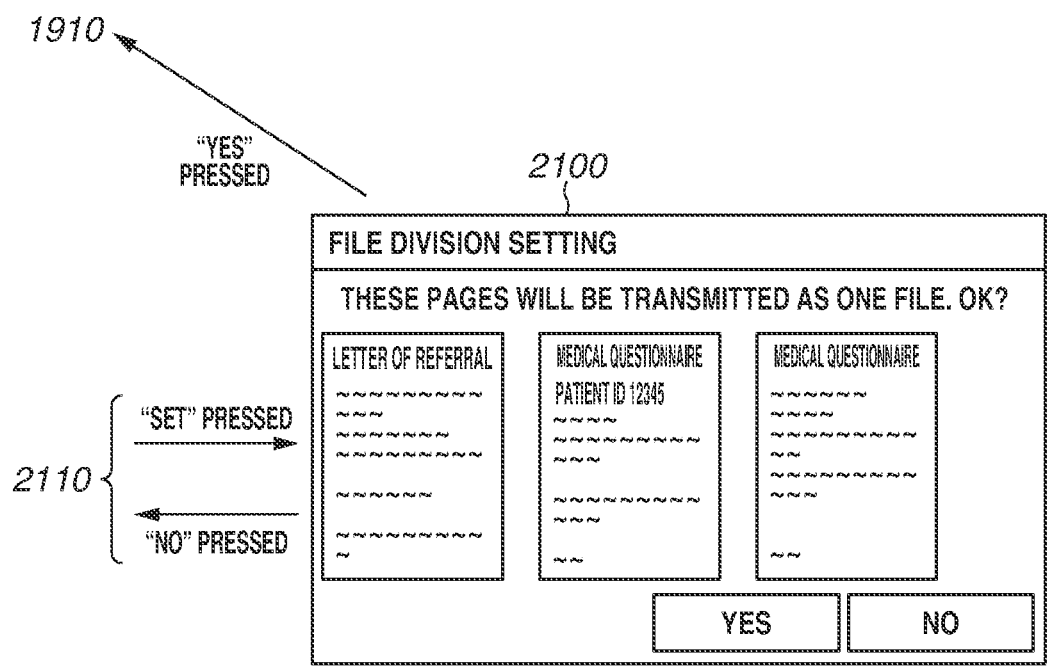

In step S2103, the CPU 201 determines whether a Yes button in the division setting screen 2100 illustrated in FIG. 21B is selected. If the CPU 201 determines that the Yes button is selected (YES in step S2103), the processing proceeds to step S2104. If the CPU 201 determines that the Yes button is not selected (NO in step S2103), the processing returns to step S1206. FIGS. 21A and 21B illustrate an example of a screen transition in a one-touch transmission scan.

In step S2104, the CPU 201 transmits an electronic file including the image data corresponding to the image currently displayed on the division setting screen 2100. At this time, the transmission destination is the folder path as a combination of the preset folder path and the character string displayed in an area 2111 upon selection of the Set button in the OCR transmission screen 1910, appended to the lowest level of the preset folder path.

In step S2105, the CPU 201 determines whether a Back or a Next button is selected. If the CPU 201 determines that the button is selected (YES in step S2105), the processing returns to step S1206. In step S1206, the CPU 201 controls the operation unit 205 to display an OCR transmission screen 2110 including the preview image or text object in an image corresponding to an image of one page before or one page after the scanning of the current document image. If the CPU 201 determines that the button is not selected (NO in step S2105), i.e., if the list of text object in the OCR transmission screen is selected, the processing proceeds to step S2106.

In step S2106, the CPU 201 controls the operation unit 205 to display the OCR transmission screen in which the character string indicated by the selected text object is displayed in the area 2111.

In step S2107, the CPU 201 determines whether all of the generated image data has been transmitted. If the CPU 201 determines that all of the generated image data has been transmitted (YES in step S2107), the CPU 201 ends the processing. If the CPU 201 determines that not all of the generated image data has been transmitted (NO in step S2107), the processing returns to step S1206.

The execution of the above-described processing makes it possible to divide a document into a plurality of sets and transmit the image data to the folder path as a combination of the preset folder path and the character string recognized from the image data of the document including the keyword of the format file for each set, appended to the lowest level of the folder path.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present exemplary embodiments have been described, it is to be understood that the disclosure is not limited to the disclosed exemplary embodiments. The scope of the following claims is to be accorded the broadest interpretation so as to encompass all such modifications and equivalent structures and functions.

What is claimed is:

1. A non-transitory computer readable storage medium for storing a computer program for causing a computer to execute a control method of an information processing apparatus, the method comprising:
performing recognition processing to obtain a character from an image indicated by image data generated by reading a document sheet; and
performing, without performing the recognition processing to obtain a character from an image indicated by image data generated by reading pages other than one page of a plurality of pages of document sheets, storing processing for storing the image data generated by reading the plurality of pages of the document sheets to a folder based on a character obtained by performing the recognition processing to the image indicated by image data generated by reading the one page of the document sheet.

2. The non-transitory computer readable storage medium according to claim 1, wherein the method further comprises:
storing a path of a folder,
wherein the folder to which the image data generated by reading the plurality of pages of the document sheets is stored is specified using at least the path of the folder and the obtained character.

3. The non-transitory computer readable storage medium according to claim 2, wherein the path of the folder includes a host name.

4. The non-transitory computer readable storage medium according to claim 2, wherein at least a folder indicated by a path in which a folder having the obtained character as a name is added to a level one lower than the path is specified as the folder.

5. The non-transitory computer readable storage medium according to claim 1, wherein the one page of the plurality of pages of the document sheets is to be read first among the plurality of pages of the document sheets.

6. The non-transitory computer readable storage medium according to claim 5, wherein the plurality of pages of the document is read based on one reading instruction.

7. The non-transitory computer readable storage medium according to claim 1, wherein the character includes a number.

8. A control method for an information processing apparatus, the method comprising:
performing recognition processing to obtain a character from an image indicated by image data generated by reading a document sheet; and
performing, without performing the recognition processing to obtain a character from an image indicated by image data generated by reading pages other than one page of a plurality of pages of document sheets, storing processing for storing the image data generated by reading the plurality of pages of the document sheets to a folder based on a character obtained by performing the recognition processing to the image indicated by image data generated by reading the one page of the document sheet.

9. An information processing apparatus, comprising:
a memory that stores instructions; and
a controller that causes, by executing the instructions, the information processing apparatus to
perform recognition processing to obtain a character from an image indicated by image data generated by reading a document sheet; and
perform, without performing the recognition processing to obtain a character from an image indicated by image data generated by reading pages other than one page of a plurality of pages of document sheets, storing processing for storing the image data generated by reading the plurality of pages of the document sheets to a folder based on a character obtained by performing the recognition processing to the image indicated by image data generated by reading the one page of the document sheet.

* * * * *